United States Patent
Yi et al.

(10) Patent No.: US 11,217,244 B2
(45) Date of Patent: Jan. 4, 2022

(54) SYSTEM FOR PROCESSING USER VOICE UTTERANCE AND METHOD FOR OPERATING SAME

(71) Applicant: Samsung Electronics Co., Ltd., Suwon-si (KR)

(72) Inventors: Jisoo Yi, Suwon-si (KR); Chunga Han, Suwon-si (KR); Marco Paolo Antonio Iacono, San Jose, CA (US); Christopher Dean Brigham, San Jose, CA (US); Gaurav Bhushan, San Jose, CA (US); Mark Gregory Gabel, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 16/534,399

(22) Filed: Aug. 7, 2019

(65) Prior Publication Data
US 2020/0051560 A1 Feb. 13, 2020

Related U.S. Application Data

(60) Provisional application No. 62/715,489, filed on Aug. 7, 2018.

(30) Foreign Application Priority Data
Dec. 26, 2018 (KR) .......................... 10-2018-0169308

(51) Int. Cl.
*G06F 40/295* (2020.01)
*G10L 15/18* (2013.01)
(Continued)

(52) U.S. Cl.
CPC ............ *G10L 15/22* (2013.01); *G06F 40/295* (2020.01); *G06F 40/30* (2020.01); *G10L 15/063* (2013.01);
(Continued)

(58) Field of Classification Search
CPC ...... G10L 15/06; G10L 15/18; G10L 15/1822; G10L 15/19; G10L 15/22; G10L 2015/223; G10L 15/063; G06F 40/295; G06F 40/35
(Continued)

(56) References Cited

U.S. PATENT DOCUMENTS 8,442,830 B2 * 5/2013 Nakajima ............. G10L 15/183
704/257
10,192,549 B2 * 1/2019 Kannan .................... G10L 15/22
(Continued)

FOREIGN PATENT DOCUMENTS

KR 10-2010-0084601 A 7/2010
KR 10-2013-0124799 A 11/2013
(Continued)

OTHER PUBLICATIONS

International Search Report dated Dec. 9, 2019, issued in International Patent Application No. PCT/KR2019/009849.
(Continued)

*Primary Examiner* — Martin Lerner
(74) *Attorney, Agent, or Firm* — Jefferson IP Law, LLP

(57) ABSTRACT

A system including at least one memory, and at least one processor operatively connected to the memory is provided. The memory may store instructions that, when executed, cause the processor to receive an input of selecting at least one domain from a user and store the input in the memory, recognize, at least partially based on data regarding a user utterance received after the input is stored, the utterance, determine, when the utterance does not comprise a domain name, whether or not the utterance corresponds to the selected domain, and generate a response by processing the utterance by using the selected domain when the utterance corresponds to the selected domain.

27 Claims, 18 Drawing Sheets

(51) Int. Cl.
*G10L 15/22* (2006.01)
*G06F 40/30* (2020.01)
*G10L 15/06* (2013.01)
*G06F 3/0481* (2013.01)

(52) U.S. Cl.
CPC ........ *G10L 15/1815* (2013.01); *G06F 3/0481* (2013.01); *G10L 2015/223* (2013.01)

(58) Field of Classification Search
USPC ..... 704/236, 243, 255, 257, 270, 270.1, 275
See application file for complete search history.

(56) References Cited

U.S. PATENT DOCUMENTS

| | | | |
|---|---|---|---|
| 10,418,033 B1* | 9/2019 | Mutagi | .................. G10L 15/30 |
| 10,580,408 B1* | 3/2020 | Hart | ........................ G10L 15/22 |
| 2008/0215320 A1* | 9/2008 | Wu | ........................ G10L 15/00 |
| | | | 704/231 |
| 2008/0319751 A1 | 12/2008 | Kennewick et al. | |
| 2009/0119268 A1* | 5/2009 | Bandaru | ............... G06F 40/258 |
| | | | 705/7.12 |
| 2009/0306981 A1* | 12/2009 | Cromack | ................ G10L 15/26 |
| | | | 704/235 |
| 2011/0141218 A1 | 6/2011 | Stancato | |
| 2011/0144999 A1 | 6/2011 | Jang et al. | |
| 2011/0161077 A1* | 6/2011 | Bielby | .................... G10L 15/22 |
| | | | 704/231 |
| 2014/0365885 A1 | 12/2014 | Carson et al. | |
| 2015/0302002 A1* | 10/2015 | Mathias | .................. G10L 15/26 |
| | | | 704/9 |
| 2016/0148612 A1 | 5/2016 | Guo et al. | |
| 2016/0203002 A1 | 7/2016 | Kannan et al. | |
| 2016/0225370 A1* | 8/2016 | Kannan | ................. G10L 15/063 |
| 2017/0084270 A1* | 3/2017 | Stern | ..................... G10L 15/183 |
| 2017/0286404 A1* | 10/2017 | Liu | ........................ G06F 40/295 |
| 2018/0190264 A1* | 7/2018 | Mixter | .................... G10L 15/22 |
| 2018/0261216 A1* | 9/2018 | Leeb | ....................... G10L 15/18 |
| 2018/0330724 A1* | 11/2018 | Miller | ................. G10L 15/1822 |
| 2019/0042561 A1* | 2/2019 | Kakirwar | ................ G06F 40/30 |

FOREIGN PATENT DOCUMENTS

| | | |
|---|---|---|
| KR | 10-2015-0084304 A | 7/2015 |
| KR | 10-2016-0059026 A | 5/2016 |
| KR | 10-2016-0147303 A | 12/2016 |
| WO | 2016/085775 A1 | 6/2016 |

OTHER PUBLICATIONS

European Search Report dated Oct. 9, 2019, issued in European Patent Application No. 19190558.7.

European Office Action dated Apr. 29, 2021, issued in European Application No. 19190558.7-1207.

* cited by examiner

SYSTEM FOR PROCESSING USER VOICE UTTERANCE AND METHOD FOR OPERATING SAME

CROSS-REFERENCE TO RELATED APPLICATION(S)

This application is based on and claims priority under 35 U.S.C. § 119(e) of a U.S. Provisional application No. 62/715,489, filed on Aug. 7, 2018, in the U.S. Patent and Trademark Office, and under 35 U.S.C. § 119(a) of a Korean patent application number. 10-2018-0169308, filed on Dec. 26, 2018, in the Korean Intellectual Property Office, the disclosure of which is incorporated by reference herein in its entirety.

JOINT RESEARCH AGREEMENT

The disclosure was made by or on behalf of the below listed parties to a joint research agreement. The joint research agreement was in effect on or before the date the disclosure was made and the disclosure was made as a result of activities undertaken within the scope of the joint research agreement. The parties to the joint research agreement are 1) Samsung Electronics Co., Ltd and 2) Viv Labs, Inc.

BACKGROUND

1. Field

The disclosure relates to a system for recognizing a user voice utterance and performing a function according to the recognized user voice utterance, and a method for operating the same.

2. Description of the Related Art

Modern electronic devices such as smartphones and tablet personal computers (PCs) have become widespread, and use of electronic devices capable of recognizing a user's voice utterance and performing a specific function have recently gradually increased. A system that recognizes the user's voice utterance can perform the function of an electronic device connected to the system, and can interwork with a $3^{rd}$ party service provider to provide a function related to the $3^{rd}$ party service provider.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a system that recognizes the user's voice utterance that performs a designated action according to a specific word or phrase included in the user's voice utterance. For example, when the user's voice utterance includes a wakeup word, the electronic device may perform a preparatory action for receiving an additional user voice utterance.

As another example, when the user's voice utterance includes a keyword that indicates a specific service provision system (for example, a service domain name), the system may perform a function related to the service provision system. In this case, the system may determine the user's intent by using the remaining content of the user voice utterance and may provide a service related to the specific service domain.

However, when the user voice utterance does not include a specific service domain name, there is a possibility that the electronic device will provide a service by using a service domain that does not match the user's intent. This is because, even if the electronic device can determine the type of the service that the user wants to be performed by using the user voice utterance, the type of service may be provided either through a single service domain or multiple service domains.

Additional aspects will be set forth in part in the description which follows and, in part, will be apparent from the description, or may be learned by practice of the presented embodiments.

In accordance with an aspect of the disclosure, when a system that recognizes the user's voice utterance has recognized a voice utterance that does not include a service domain name, the system may process the recognized voice utterance by using a service domain that is selected by the user in advance.

In accordance with another aspect of the disclosure, a system that recognizes the user's voice utterance may receive selection of a specific service domain from the user and may train a natural language understanding model, which is used to process the user voice utterance, such that the user can be provided with a desired service by using a voice utterance that does not include a service domain name.

In accordance with another aspect of the disclosure, an apparatus is provided. The apparatus includes at least one memory, and at least one processor operatively connected to the memory. The memory may store instructions that, when executed, cause the processor to receive an input of selecting at least one domain from a user, after the input, receive a user utterance, recognize, content from the user utterance, when the content does not comprise a business entity, determine whether the content corresponds to the at least one domain, and when the content corresponds to the at least one domain, processing the content by using the at least one domain to generate a response.

In accordance with another aspect of the disclosure, a method for operating an apparatus is provided. The method includes the operations of receiving an input of selecting at least one domain from a user, after the input, receiving a user utterance, recognizing contents from the user utterance, when the content does not comprise a business entity, determining whether the content corresponds to the at least one domain, and when the content corresponds to the at least one domain, processing the content by using the at least one domain to generate a response.

An electronic device according to various embodiments is advantageous in that, when a voice utterance processing system that supports multiple service domains uses a service domain designation utterance policy, a voice utterance can be processed, even if no service domain is designated, with regard to a service domain preselected by the user, thereby increasing the intent identification performance of the voice utterance processing system and improving the user's usability and convenience.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
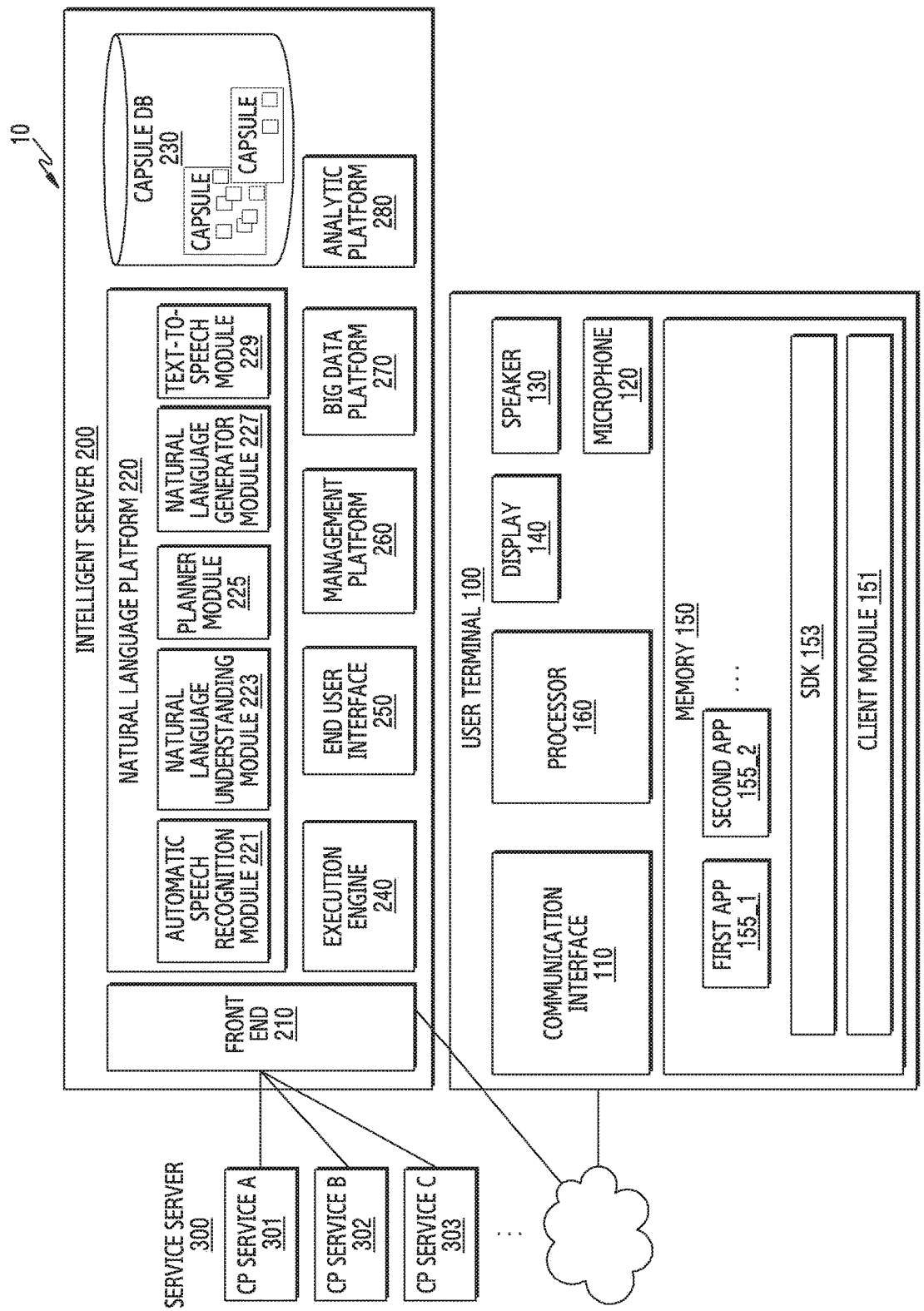
FIG. 1 is a block diagram illustrating an integrated intelligence system according to an embodiment of the disclosure.

FIG. 1 is a block diagram illustrating an integrated intelligence system according to an embodiment of the disclosure.

Referring to FIG. 1, an integrated intelligent system 10 according to an embodiment may include a user terminal 100, an intelligent server 200, and a service server 300.

The user terminal 100 in an embodiment may be a terminal device (or an electronic device) that can be connected to the Internet, and may be, for example, a mobile phone, a smartphone, a personal digital assistant (PDA), a laptop computer, a television (TV), a home appliance, a wearable device, a head mounted display (HMD), or a smart speaker.

According to the illustrated embodiment, the user terminal 100 may include a communication interface 110, a microphone 120, a speaker 130, a display 140, a memory 150, and a processor 160. The enumerated components may be connected to each other operatively or electrically.

The communication interface 110 in an embodiment may be connected to an external device and configured to transmit/receive data. The microphone 120 in an embodiment may receive a sound (for example, a user utterance) and may convert the same into an electric signal. The speaker 130 in an embodiment may output the electric signal as a sound (for example, a voice). The display 140 in an embodiment may be configured to display images or videos. The display 140 in an embodiment may also display a graphic user interface (GUI) of an executed app (also referred to as an application program).

The memory 150 in an embodiment may store a client module 151, a software development kit (SDK) 153, and multiple apps 155. The client module 151 and the SDK 153 may constitute a framework (for a solution program) for performing a versatile function. In addition, the client module 151 or the SDK 153 may constitute a framework for processing a voice input.

The multiple apps 155 stored in the memory 150 in an embodiment may be programs for performing a designated function. According to an embodiment, the multiple apps 155 may include a first app 155_1 and a second app 155_2. According to an embodiment, each of the multiple apps 155 may include multiple actions for performing a designated function. For example, the apps may include a notification app, a message app, and/or a schedule app. According to an embodiment, the multiple apps 155 may be executed by a processor 160 so as to successively execute at least some of the multiple actions.

The processor 160 in an embodiment may control the overall action of the user terminal 100. For example, the processor 160 may be electrically connected to the communication interface 110, the microphone 120, the speaker 130, and the display 140 so as to perform a designated action.

The processor 160 in an embodiment may also execute a program stored in the memory 150 so as to perform a designated function. For example, the processor 160 may execute at least one of the client module 151 or the SDK 153 so as to perform a follow-up action for processing a voice input. The processor 160 may control the action of the multiple apps 155 through the SDK 153, for example. The follow-up action that has been described as an action of the client module 151 or the SDK 153 may be an action resulting from execution of the processor 160.

The client module 151 in an embodiment may receive a voice input. For example, the client module 151 may receive a voice signal corresponding to a user utterance sensed through the microphone 120. The client module 151 may transmit the received voice input to the intelligent server 200. The client module 151 may transmit, together with the received voice input, information regarding the state of the user terminal 100 to the intelligent server 200. The state information may be, for example, information regarding the execution state of an app.

The client module 151 in an embodiment may receive a result corresponding to the received voice input. For example, when the intelligent server 200 calculates a result corresponding to the received voice input, the client module 151 may receive the result corresponding to the received voice input. The client module 151 may display the received result on the display 140.

The client module 151 in an embodiment may receive a plan corresponding to the received voice input. The client module 151 may display, on the display 140, the result of executing multiple actions of an app according to the plan. The client module 151 may successively display, for example, the result of executing multiple actions on the display. As another example, the user terminal 100 may display only a part of the result of executing multiple actions (for example, the result of the last action) on the display.

According to an embodiment, the client module 151 may receive, from the intelligent server 200, a request for acquiring information necessary to calculate a result corresponding to a voice input. According to an embodiment, the client module 151 may transmit, in response to the request, the necessary information to the intelligent server 200.

The client module 151 in an embodiment may transmit, to the intelligent server 200, information regarding the result of executing multiple actions according to the plan. The intelligent server 200 may confirm, by using the result information, that the received voice input has been correctly processed.

The client module 151 in an embodiment may include a voice recognition module. According to an embodiment, the client module 151 may recognize a voice input that performs a limited function through the voice recognition module. For example, the client module 151 may perform an intelligent app for processing a voice input for performing an organic action through a designated input (for example, "wake up!").

The intelligent server 200 in an embodiment may receive information related to a user voice input from the user terminal 100 through a communication network. According to an embodiment, the intelligent server 200 may change data related to the received voice input into text data. According to an embodiment, the intelligent server 200 may generate a plan for performing a task corresponding to the user voice input based on the text data.

According to an embodiment, the plan may be generated by an artificial intelligent (AI) system. The AI system may be a rule-based system or may be a neural network-based system (for example, a feed-forward neural network (FNN) or a recurrent neural network (RNN)). Alternatively, the AI system may be combination of the above-mentioned systems or a system different therefrom. According to an embodiment, the plan may be selected from a predefined set of plans or may be generated in real time in response to a user request. For example, the AI system may select at least one plan from multiple predefined plans.

The intelligent server 200 in an embodiment may transmit a result that follows a generated plan to the user terminal 100, or may transmit the generated plan to the user terminal 100. According to an embodiment, the user terminal 100 may display the result that follows the plan. According to an embodiment, the user terminal 100 may display the result of executing an action according to the plan.

The intelligent server 200 in an embodiment may include a front end 210, a natural language platform 220, a capsule database (DB) 230, an execution engine 240, an end user interface 250, a management platform 260, a big data platform 270, or an analytic platform 280.

The front end 210 in an embodiment may receive a voice input received from the user terminal 100. The front end 210 may transmit a response corresponding to the voice input.

According to an embodiment, the natural language platform 220 may include an automatic speech recognition (ASR) module 221, a natural language understanding (NLU) module 223, a planner module 225, a natural language generator (NLG) module 227, and a text-to-speech module (TTS) module 229.

The ASR module 221 in an embodiment may convert a voice input received from the user terminal 100 into text data that may include a command to perform an action. The NLU module 223 in an embodiment may identify the user's intent (i.e., the action to be performed that is intended by the user) by using the text data of the voice input. For example, the NLU module 223 may identify the user's intent by performing syntactic analysis or semantic analysis. The NLU module 223 in an embodiment may identify the meaning of a word extracted from the voice input by using a linguistic feature (for example, a syntactic element) of a morpheme or a phrase, and may match the identified meaning of the word with the intent, thereby determining the user's intent.

The planner module 225 in an embodiment may generate a plan by using the user's intent and a parameter. According to an embodiment, the planner module 225 may determine multiple domains necessary to perform a task based on the user's intent. The planner module 225 may determine multiple actions included in multiple domains, respectively, based on the user's intent. According to an embodiment, the planner module 225 may determine a parameter necessary to execute the multiple actions or a result value output by execution of the multiple actions. The parameter and the result value may be determined as concepts in a designated format (or class). Accordingly, a plan may include multiple actions determined according to the user's intent, and multiple concepts. The planner module 225 may determine the relation between the multiple actions and the multiple concepts in a stepwise manner (for hierarchically). For example, the planner module 225 may determine the order of executing multiple actions that are determined based on the user's intent, based on the multiple concepts. In other words, the planner module 225 may determine an order of executing multiple actions based on a parameter necessary to execute the multiple actions and a result output by execution of the multiple actions. Accordingly, the planner module 225 may generate a plan including information regarding the association (for example, ontology) between the multiple actions and the multiple concepts. The planner module 225 may generate a plan by using information stored in the capsule DB 230 that stores a set of relations between concepts and actions.

The NLG module 227 in an embodiment may change designated information into a text type. The information changed into a text type may be of a natural language utterance type. The TTS module 229 in an embodiment may change text-type information into voice-type information.

According to an embodiment, part or all of the function of the natural language platform 220 may also be implemented by the user terminal 100.

The capsule DB 230 may store information regarding the relation between multiple concepts and actions, which correspond to multiple domains. A capsule in an embodiment may include multiple action objects (or action information) and concept objects (or concept information) included in a plan. According to an embodiment, the capsule DB 230 may store multiple capsules in a concept action network (CAN) type. According to an embodiment, the multiple capsules may be stored in a function registry included in the capsule DB 230.

The capsule DB 230 may include a strategy registry that stores strategy information necessary to determine a plan corresponding to a voice input. When there are multiple plans corresponding to a voice input, the strategy information may include reference information for determining one plan. According to an embodiment, the capsule DB 230 may include a follow-up registry that stores information regarding a follow-up action for proposing a follow-up action to the user in a designated situation. The follow-up action may include, for example, a follow-up utterance. According to an embodiment, the capsule DB 230 may include a layout registry that stores information regarding the layout of information output through the user terminal 100. According to an embodiment, the capsule DB 230 may include a vocabulary registry that stores vocabulary information included in capsule information. According to an embodiment, the capsule DB 230 may include dialog registry that stores information regarding a dialog (or interaction) with the user. The capsule DB 230 may update a stored object through a developer tool. The developer tool may include a function editor for updating an action object or a concept object, for example. The developer tool may include a vocabulary editor for updating vocabularies. The developer tool may include a strategy editor for generating and registering a strategy for determining a plan. The developer tool may include a dialog editor for generating a dialog with the user. The developer tool may include a follow-up editor capable of activating a follow-up objective and editing a follow-up utterance that provides a hint. The follow-up objective may be determined on the basis of the currently configured objective, the user's preference, or the environment condition. In an embodiment, the capsule DB 230 may also be implemented inside the user terminal 100.

The execution engine 240 in an embodiment may calculate a result by using the generated plan. The end user interface 250 may transmit the calculated result to the user terminal 100. Accordingly, the user terminal 100 may receive the result and provide the received result to the user. The management platform 260 in an embodiment may manage information used by the intelligent server 200. The big data platform 270 in an embodiment may collect the user's data. The analytic platform 280 in an embodiment may manage the quality of service (QoS) of the intelligent server 200. For example, the analytic platform 280 may manage the components of the intelligent server 200 and the processing rate (or efficiency) thereof.

The service server 300 in an embodiment may provide a designated service (for example, food ordering or hotel reservation) to the user terminal 100. According to an embodiment, the service server 300 may be a server administered by a third party and may include a plurality of services such as capsule provider (CP) service A 301, CP service B, 302, and CP service C 303. The service server 300 in an embodiment may provide the intelligent server 200 with information for generating a plan corresponding to a received voice input. The provided information may be stored in the capsule DB 230. In addition, the service server 300 may provide the intelligent server 200 with information regarding the result of following the plan.

In the above-described integrated intelligent system 10, the user terminal 100 may provide the user with various intelligent services in response to a user input. The user input may include, for example, an input through a physical button and a touch input or a voice input.

In an embodiment, the user terminal 100 may provide a voice recognition service through an intelligent app (or a voice recognition app) stored in the user terminal 100. In this case, the user terminal 100 may recognize a user utterance or a voice input received through the microphone, for example, and may provide the user with a service corresponding to the recognized voice input.

In an embodiment, the user terminal 100 may perform a designated action alone or together with the intelligent server and/or the service server on the basis of the received voice input. For example, the user terminal 100 may execute an app corresponding to the received voice input, and may perform a designated action through the executed app.

In an embodiment, when the user terminal 100 provides a service together with the intelligent server 200 and/or the service server 300, the user terminal may sense a user utterance by using the microphone 120, and may generate a signal (or voice data) corresponding to the sensed user utterance. The user terminal may transmit the voice data to the intelligent server 200 by using the communication interface 110.

In response to the voice input received from the user terminal 100, the intelligent server 200 according to an embodiment may generate a plan for performing a task corresponding to the voice input, or the result of performing an action according to the plan. The plan may include, for example, multiple actions for performing a task corresponding to the user's voice input, and multiple concepts related to the multiple actions. The concepts may correspond to definition of parameters that are input to execute the multiple actions, or definition of result values that are output by executing the multiple actions. The plan may include information regarding the association between multiple actions and multiple concepts.

The user terminal 100 in an embodiment may receive the response by using the communication interface 110. The user terminal 100 may output a voice signal generated inside the user terminal 100 by using the speaker 130, or may output an image generated inside the user terminal 100 by using the display 140.

Figure 2:
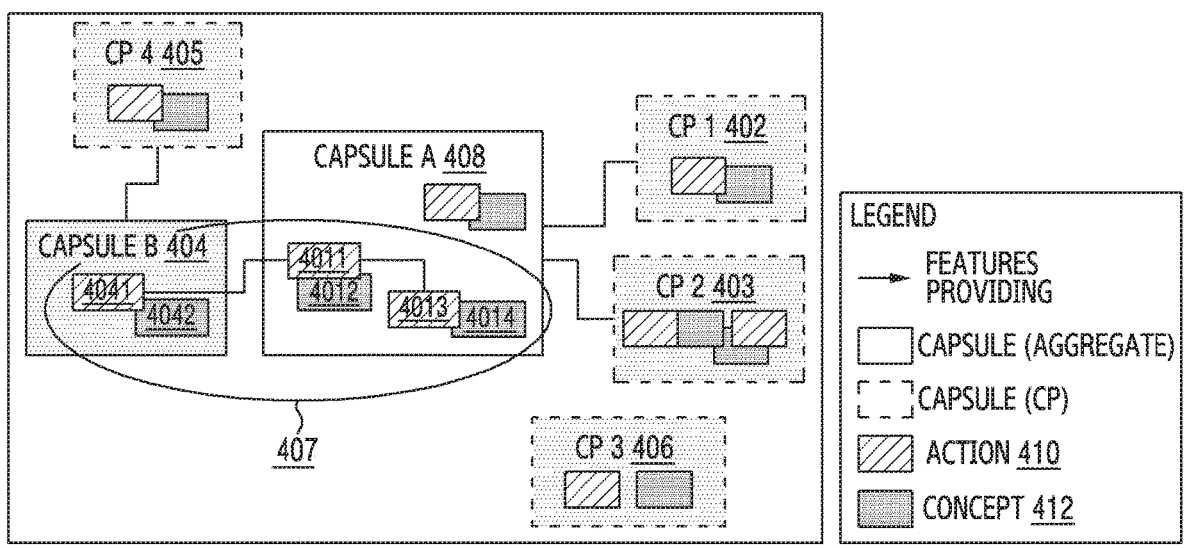
FIG. 2 is a diagram illustrating a type of stored information regarding a relationship between concepts and actions in a database (DB) according to an embodiment of the disclosure.

FIG. 2 is a diagram illustrating a type of stored information regarding a relationship between concepts and actions in a DB according to an embodiment of the disclosure.

Referring to FIG. 2, a capsule DB (for example, the capsule DB 230) of the intelligent server 200 may store a capsule in a CAN type. The capsule DB may store an action for processing a task corresponding to the user's voice input and a parameter for the action in a CAN type.

The capsule DB may store multiple capsules (capsule A 408 and capsule B 404) corresponding to multiple domains (applications), respectively. According to an embodiment, one capsule (for example, capsule A 408) may correspond to one domain (for example, position (geolocation) or application). In addition, one capsule may correspond to at least one service provider (for example, a first CP 402, a second CP 403, a third CP 406, or a fourth CP 405) for performing a function regarding the domain related to the capsule. According to an embodiment, one capsule may include at least one action 410 and at least one concept 412 for performing a designated function.

The natural language platform 220 may generate a plan for performing a task corresponding to a received voice input by using a capsule stored in the capsule DB. For example, the planner module 225 of the natural language platform may generate a plan by using a capsule stored in the capsule DB. For example, a plan 407 may be generated by using the actions 4011 and 4013 and the concepts 4012 and 4014 in capsule A 408 and the action 4041 and the concept 4042 in capsule B 404.

Figure 3:
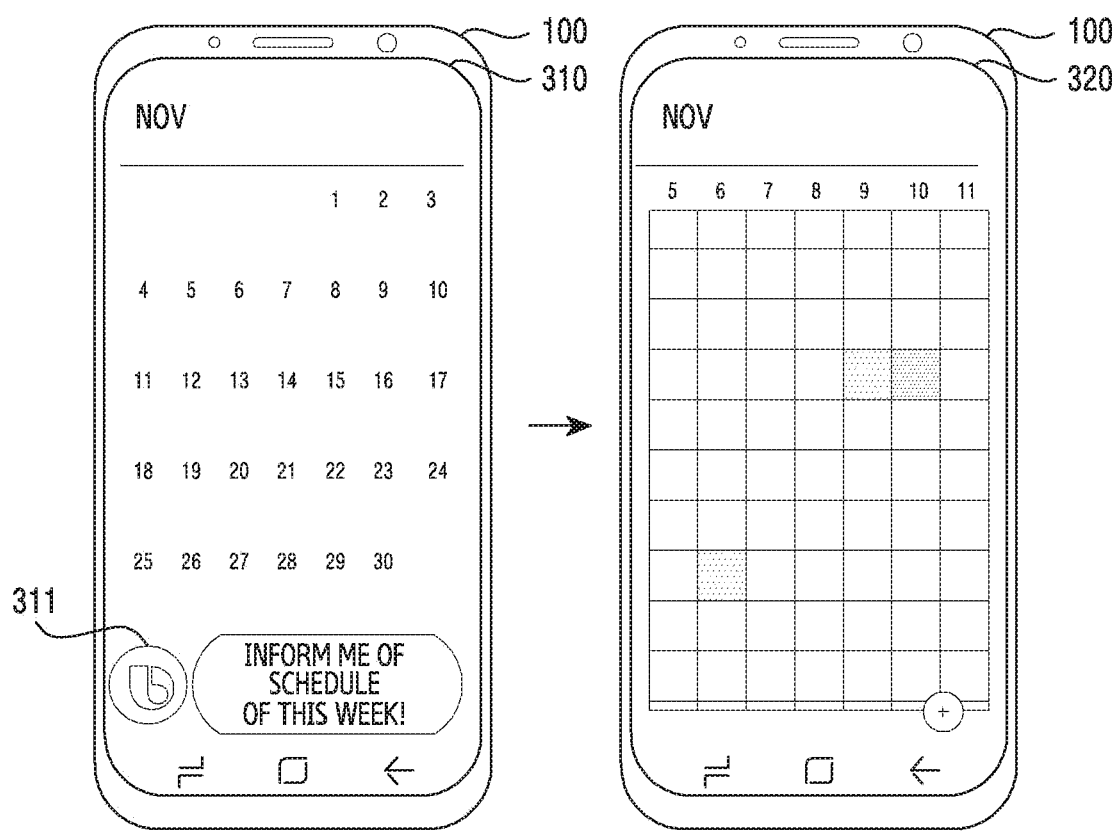
FIG. 3 is a diagram illustrating a user terminal that displays a screen for processing a received voice input through an intelligent app according to an embodiment of the disclosure.

FIG. 3 is a diagram illustrating a screen used by a user terminal to process a received voice input through an intelligent app according to an embodiment of the disclosure.

Referring to FIG. 3, a user terminal 100 may execute an intelligent app for processing a user input through an intelligent server 200. According to an embodiment, if the user terminal 100 recognizes a designated voice input (for example, "wake up!") or receives an input through a hardware key (for example, a dedicated hardware key), the user terminal 100 may execute an intelligent app for processing the voice input. The user terminal 100 may execute the intelligent app while a schedule app is being executed, for example. According to an embodiment, the user terminal 100 may display an object (for example, an icon) 311 corresponding to the intelligent app on the display 140. According to an embodiment, the user terminal 100 may receive a voice input resulting from a user utterance. For example, the user terminal 100 may receive a voice input "inform me of the schedule of this week!" According to an embodiment, the user terminal 100 may display, on the display, a GUI 310 (for example, an input window) of the intelligent app, on which text data of the received voice input is displayed.

According to an embodiment, the user terminal 100 may display a screen 320 including a result corresponding to the received voice input. For example, the user terminal 100 may receive a plan corresponding to the received user input, and may display "schedule of this week" on the display according to the plan.

Figure 4:
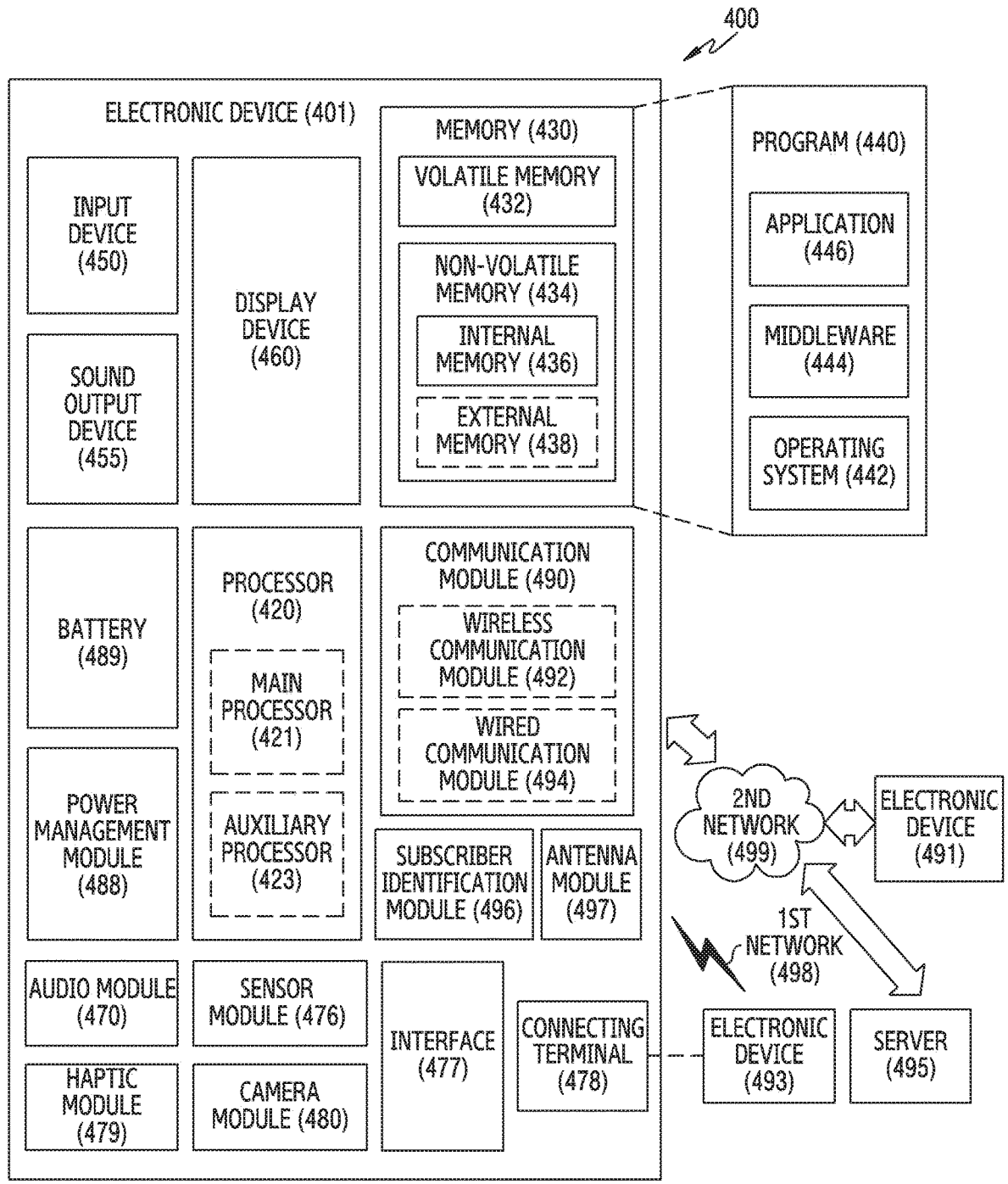
FIG. 4 is a block diagram of an electronic device inside a network environment according to an embodiment of the disclosure.

FIG. 4 is a block diagram illustrating an electronic device in a network environment according to an embodiment of the disclosure.

Referring to FIG. 4, a network environment 400 may include an electronic device 401 that corresponds to the user terminal 100 illustrated in FIG. 1.

The electronic device 401 in the network environment 400 may communicate with an electronic device 493 via a first network 498 (e.g., a short-range wireless communication network), or an electronic device 493 or a server 495 via a second network 499 (e.g., a long-range wireless communication network). According to an embodiment, the electronic device 401 may communicate with the electronic device 491 via the server 495. According to an embodiment, the electronic device 401 may include a processor 420, memory 430, an input device 450, a sound output device 455, a display device 460, an audio module 470, a sensor module 476, an interface 477, a haptic module 479, a camera module 480, a power management module 488, a battery 489, a communication module 490, a subscriber identification module (SIM) 496, or an antenna module 497. In some embodiments, at least one (e.g., the display device 460 or the camera module 480) of the components may be omitted from the electronic device 401, or one or more other components may be added in the electronic device 401. In some embodiments, some of the components may be implemented as single integrated circuitry. For example, the sensor module 476 (e.g., a fingerprint sensor, an iris sensor, or an illuminance sensor) may be implemented as embedded in the display device 460 (e.g., a display).

The processor 420 may execute, for example, software (e.g., a program 440) to control at least one other component (e.g., a hardware or software component) of the electronic device 401 coupled with the processor 420, and may perform various data processing or computation. According to an embodiment, as at least part of the data processing or computation, the processor 420 may load a command or data received from another component (e.g., the sensor module 476 or the communication module 490) in volatile memory 432, process the command or the data stored in the volatile memory 432, and store resulting data in non-volatile memory 434. According to an embodiment, the processor 420 may include a main processor 421 (e.g., a central processing unit (CPU) or an application processor (AP)), and an auxiliary processor 423 (e.g., a graphics processing unit (GPU), an image signal processor (ISP), a sensor hub processor, or a communication processor) that is operable independently from, or in conjunction with, the main processor 421. Additionally or alternatively, the auxiliary processor 423 may be adapted to consume less power than the main processor 421, or to be specific to a specified function. The auxiliary processor 423 may be implemented as separate from, or as part of the main processor 421.

The auxiliary processor 423 may control at least some of functions or states related to at least one component (e.g., the display device 460, the sensor module 476, or the communication module 490) among the components of the electronic device 401, instead of the main processor 421 while the main processor 421 is in an inactive (e.g., sleep) state, or together with the main processor 421 while the main processor 421 is in an active state (e.g., executing an application). According to an embodiment, the auxiliary processor 423 (e.g., an image signal processor or a communication processor) may be implemented as part of another component (e.g., the camera module 480 or the communication module 490) that is functionally related to the auxiliary processor 423.

The memory 430 may store various data used by at least one component (e.g., the processor 420 or the sensor module 476) of the electronic device 401. The various data may include, for example, software (e.g., the program 440) and input data or output data for a command related thereto. The memory 430 may include the volatile memory 432 and the non-volatile memory 434.

The program 440 may be stored in the memory 430 as software, and may include, for example, an operating system (OS) 442, middleware 444, or an application 446.

The input device 450 may receive a command or data to be used by other component (e.g., the processor 420) of the electronic device 401, from the outside (e.g., a user) of the electronic device 401. The input device 450 may include, for example, a microphone, a mouse, or a keyboard.

The sound output device 455 may output sound signals to the outside of the electronic device 401. The sound output device 455 may include, for example, a speaker or a receiver. The speaker may be used for general purposes, such as playing multimedia or playing an recording, and the receiver may be used for an incoming calls. According to an embodiment, the receiver may be implemented as separate from, or as part of the speaker.

The display device 460 may visually provide information to the outside (e.g., a user) of the electronic device 401. The display device 460 may include, for example, a display, a hologram device, or a projector and control circuitry to control a corresponding one of the display, hologram device, and projector. According to an embodiment, the display device 460 may include touch circuitry adapted to detect a touch, or sensor circuitry (e.g., a pressure sensor) adapted to measure the intensity of force incurred by the touch.

The audio module 470 may convert a sound into an electrical signal and vice versa. According to an embodiment, the audio module 470 may obtain the sound via the input device 450, or output the sound via the sound output device 455 or a headphone of an external electronic device (e.g., an electronic device 493) directly (e.g., wired) or wirelessly coupled with the electronic device 401.

The sensor module 476 may detect an operational state (e.g., power) of the electronic device 401 or an environmental state (e.g., a state of a user or a temperature of the environment) external to the electronic device 401, and then generate an electrical signal or data value corresponding to the detected state. According to an embodiment, the sensor module 476 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 477 may support one or more specified protocols to be used for the electronic device 401 to be coupled with the external electronic device (e.g., the electronic device 493) directly (e.g., wired) or wirelessly. According to an embodiment, the interface 477 may include, for example, a high definition multimedia interface (HDMI), a universal serial bus (USB) interface, a secure digital (SD) card interface, or an audio interface.

A connecting terminal 478 may include a connector via which the electronic device 401 may be physically connected with the external electronic device (e.g., the electronic device 493). According to an embodiment, the connecting terminal 478 may include, for example, a HDMI connector, a USB connector, a SD card connector, or an audio connector (e.g., a headphone connector).

The haptic module 479 may convert an electrical signal into a mechanical stimulus (e.g., a vibration or a movement) or electrical stimulus which may be recognized by a user via his tactile sensation or kinesthetic sensation. According to an embodiment, the haptic module 479 may include, for example, a motor, a piezoelectric element, or an electric stimulator.

The camera module 480 may capture a still image or moving images. According to an embodiment, the camera module 480 may include one or more lenses, image sensors, image signal processors, or flashes.

The power management module 488 may manage power supplied to the electronic device 401. According to an embodiment, the power management module 488 may be implemented as at least part of, for example, a power management integrated circuit (PMIC).

The battery 489 may supply power to at least one component of the electronic device 401. According to an embodiment, the battery 489 may include, for example, a primary cell which is not rechargeable, a secondary cell which is rechargeable, or a fuel cell.

The communication module 490 may support establishing a direct (e.g., wired) communication channel or a wireless communication channel between the electronic device 401 and the external electronic device (e.g., the electronic device 491, the electronic device 493, or the server 495) and performing communication via the established communication channel. The communication module 490 may include one or more communication processors that are operable independently from the processor 420 (e.g., the AP) and supports a direct (e.g., wired) communication or a wireless communication. According to an embodiment, the communication module 490 may include a wireless communication module 492 (e.g., a cellular communication module, a short-range wireless communication module, or a global navigation satellite system (GNSS) communication module) or a wired communication module 494 (e.g., a local area network (LAN) communication module or a power line communication (PLC) module). A communication module may communicate with the external electronic device via the first network 498 (e.g., a short-range communication network, such as Bluetooth™, wireless-fidelity (Wi-Fi) direct, or infrared data association (IrDA)) or the second network 499 (e.g., a long-range communication network, such as a cellular network, the Internet, or a computer network (e.g., LAN or wide area network (WAN)). These various types of communication modules may be implemented as a single component (e.g., a single chip), or may be implemented as multiple components (e.g., multiple chips) separate from each other. The wireless communication module 492 may identify and authenticate the electronic device 401 in a communication network, such as the first network 498 or the second network 499, using subscriber information (e.g., international mobile subscriber identity (IMSI)) stored in the SIM 496.

The antenna module 497 may transmit or receive a signal or power to or from the outside (e.g., the external electronic device) of the electronic device 401. According to an embodiment, the antenna module 497 may include one or more antennas, and, therefrom, at least one antenna appropriate for a communication scheme used in the communication network, such as the first network 498 or the second network 499, may be selected, for example, by the communication module 490 (e.g., the wireless communication module 492). The signal or the power may then be transmitted or received between the communication module 490 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 401 and the external electronic device 491 via the server 495 coupled with the second network 499. Each of the electronic devices 491 and 493 may be a device of a same type as, or a different type, from the electronic device 401. According to an embodiment, all or some of operations to be executed at the electronic device 401 may be executed at one or more of the external electronic devices 491, 493, or 495. For example, if the electronic device 401 should perform a function or a service automatically, or in response to a request from a user or another device, the electronic device 401, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 401. The electronic device 401 may provide the outcome, with or without further processing of the outcome, as at least part of a reply to the request. To that end, a cloud computing, distributed computing, or client-server computing technology may be used, for example.

The electronic device according to various embodiments disclosed herein may be various types of devices. The electronic devices may include, for example, a portable communication device (e.g., a smart phone), a computer device, a portable multimedia device, a portable medical device, a camera, a wearable device, or a home appliance. The electronic device according to one embodiment of the disclosure is not limited to the above described devices.

The various embodiments and the terms used herein are not intended to limit the technical features disclosed herein to specific embodiments, and should be understood as including various modifications, equivalents, and/or alternatives to the corresponding embodiments. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," or "connected with,", it means that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," or "circuitry." A module may be a single integral component, or a minimum unit or part thereof, adapted to perform one or more functions. According to an embodiment, for example, the module may be implemented in the form of an application-specific integrated circuit (ASIC).

Various embodiments as set forth herein may be implemented as software (e.g., the program 440) including one or more instructions that are stored in a storage medium (e.g., internal memory 436 or external memory 438) that is readable by a machine (e.g., the electronic device 401). For example, a processor (e.g., the processor 420) of the machine (e.g., the electronic device 401) may invoke at least one of the one or more instructions stored in the storage medium, and execute it. This allows the machine to be operated to perform at least one function according to the invoked at least one instruction. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more components of the above-described components or operations may be omitted, or one or more other components or operations may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 5:
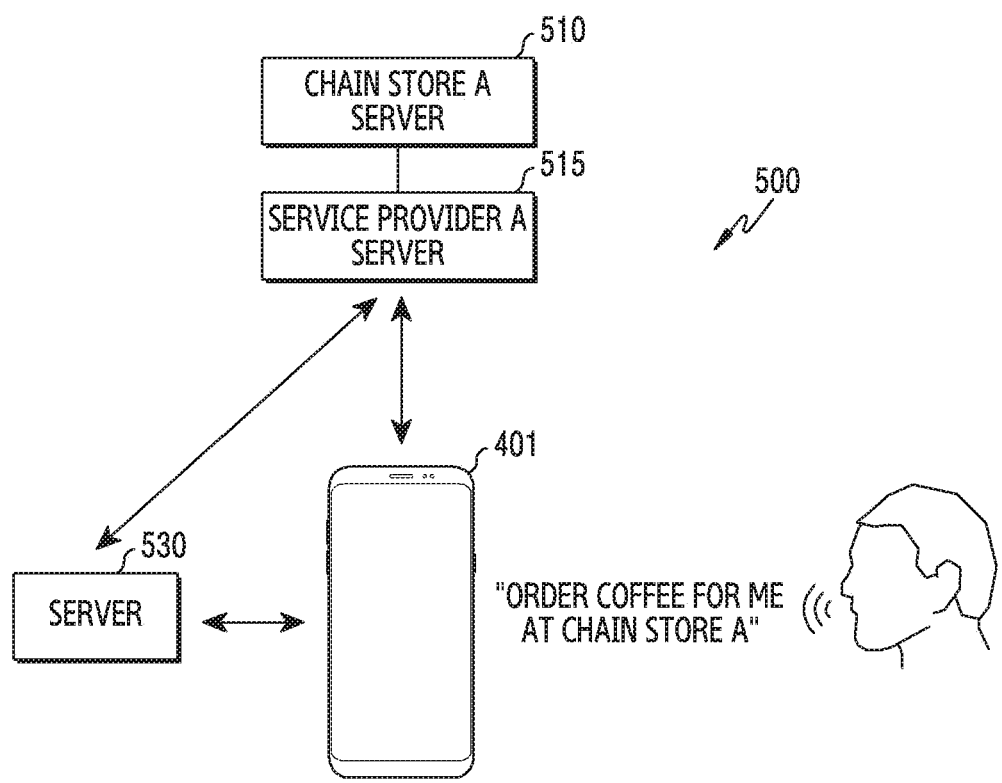
FIG. 5 is a diagram illustrating actions of a voice utterance processing system according to an embodiment of the disclosure.

FIG. 5 is a diagram illustrating actions of a voice utterance processing system according to an embodiment of the disclosure.

Referring to FIG. 5, a voice utterance processing system 500 may include an electronic device 401 and a server 530. In an embodiment, the electronic device 401 illustrated in FIG. 5 may correspond to the electronic device 401 illustrated in FIG. 4 or the user terminal 100 illustrated in FIG. 1, and the server 530 may correspond to the intelligent server 200 illustrated in FIG. 1.

In an embodiment, the electronic device 401 may receive the user's voice utterance by using the microphone (not illustrated; for example, the microphone 120 of FIG. 1) included in the electronic device 401. For example, the electronic device 401 may receive voice signal data (for example, "order coffee for me at chain store A" or "order espresso coffee at Starbucks™") corresponding to the user's voice utterance.

In an embodiment, the electronic device 401 may transmit data regarding the user's voice utterance that has been received to the server 530, and may receive information regarding a response to the voice utterance from the server 530. For example, when the electronic device 401 has transmitted data regarding a voice utterance such as "order coffee for me at chain store A" to the server 530, the electronic device 401 may receive information regarding a response to the coffee order from the server 530 (for example, response information indicating that chain store A has successfully received the coffee order). In this case, the information regarding a response to the voice utterance may be generated by processing data regarding the voice utterance by the server 530, or by performing additional data communication with another server by the server 530. For example, the information regarding a response to the coffee order may be generated by performing additional data communication with the service provider A server 515 by the server 530.

In an embodiment, the electronic device 401 may include at least one component (or a module, such as an ASR module) for processing data regarding a voice utterance. In this case, the electronic device 401 may also receive information regarding a response to the voice utterance by performing data communication with another server, which is different from the server 530, independently of the server 530 (or by bypassing the server 530).

In an embodiment, the server 530 may generate, by using data regarding a voice utterance received from the electronic device 401, information regarding a response to the voice utterance. The server 530 may acquire information by analyzing the data regarding the voice utterance, and may perform data communication with another server on the basis of the acquired data, thereby generating response information.

In an embodiment, in connection with analyzing the data regarding the voice utterance, the server 530 may confirm whether or not the voice utterance includes an explicit service domain that identifies a legal business entity (i.e., the name of a business entity). For example, the server 530 may confirm that the voice utterance ("order coffee for me at chain store A") includes an explicit service domain name (i.e., "chain store A").

In an embodiment, the service domain may distinguish the type of the service provided to the user in order to perform a function that corresponds to the user intent included in the user utterance, or the service provider (or the subject of provision). For example, the service domain may be related to a capsule corresponding to a specific service (hereinafter, referred to as "a service capsule"). The service domain may be related to a service capsule corresponding to a coffee ordering service (for example, capsule A 408 illustrated in FIG. 2). As another example, the service domain may also be related to at least one service provider who provides a service related to the service capsule. For example, the service domain may also be related to at least one service provider (for example, the first CP 402) who provides a service relates to capsule A 408.

In an embodiment, the service domain name may be a keyword indicating a specific service domain. For example, the service domain name may be "Starbucks" or "McCafe."

For example, the first service domain may be installed in the server 530 (or stored therein), and may correspond to a first application (or a first service capsule) administered by a third service provider (for example, coffee chain company A). The service domain name of the first service domain may be the name of a $3^{rd}$ party service provider (for example, "A") or the name of the first application (or the first service capsule).

As another example, the second service domain may be installed in the server 530 by default (or stored therein), and may correspond to a second application (for example, a gallery) (or a second service capsule) administered by the manufacturer of the electronic device 401 (or the communication company to which the user has subscribed). The service domain name of the second service domain may be the name of the second application (or the second service capsule).

As another example, the third service domain may correspond to a third service capsule which is provided by a third service provider who administers a user voice recognition service system (for example, Siri or Bixby), and which is related to a specific topic (for example, navigation). The service domain name of the third service domain may be a keyword (for example, path finding) that can represent the specific topic. In this case, multiple service domains (or service capsules or applications) may be related to the specific topic.

In an embodiment, substantially identical services may be provided on the basis of different service domains. For example, a coffee ordering service by coffee chin company A may be provided by an application installed in the electronic device 401, but may also be provided independently of execution of the application installed in the electronic device 401. For example, the electronic device 401 may receive data (for example, user interface data) necessary to provide the service from outside the electronic device 401 (for example, from the server 530 in which the first application is installed), and may provide the service on the basis of the received data.

In an embodiment, information regarding one or more service domains may be stored in the electronic device 401 or in an external device (for example, the server 530). For example, information regarding a specific service domain may include at least one of the category (coffee or beverage) to which the specific service domain (for example, Starbucks) belongs, the list of services that can be provided to the user on the basis of the specific service domain (coffee ordering (easy order or siren order) and my own menu), the common topic of the services that can be provided to the user, or information regarding whether or not the specific service domain has been configured as a selected service domain.

In an embodiment, the server 530 may determine the intent of the user voice utterance and a specific parameter by using at least a part of the data regarding the voice utterance. For example, the server 530 may determine the intent ("order") of the user voice utterance and the specific parameter ("ordering target=coffee") by using the remaining part ("order coffee for me") of the data regarding the voice utterance, other than the explicit service domain name ("chain store A"). In an embodiment, in connection with determining the intent of the user voice utterance and the parameter, information regarding a service domain corresponding to the explicit service domain name, which is included in the data regarding the voice utterance, may be used. For example, the electronic device 401 may determine the intent of the user voice utterance and the parameter by using a NLU module that corresponds to the service domain corresponding to the explicit service domain name.

In an embodiment, when data regarding a voice utterance includes an explicit service domain name, the server 530 may perform at least one function by using at least one of information regarding a service domain corresponding to the included service domain name, the intent of the user's voice utterance, and a specific parameter. For example, when data regarding a voice utterance includes an explicit service domain name (for example, "chain store A"), the server 530 may access the service provider A server 515 by using a first service domain (for example, a first application) corresponding to the included service domain name (or by using information regarding the first service domain), and may transmit information for ordering coffee to the accessed service provider A server 515. The server 530 may generate response information by using information received from the accessed server 515, and may transmit the same to the electronic device 401. The service provider A server 515 may transmit the order information to the chain store A server 510 (for example, server corresponding to a specific offline store of coffee chain A). The service provider B server 525 may also transmit the order information to the chain store B server 520. The action of at least one server 530 illustrated in FIG. 5 may be performed by the electronic device 401.

Figure 6:
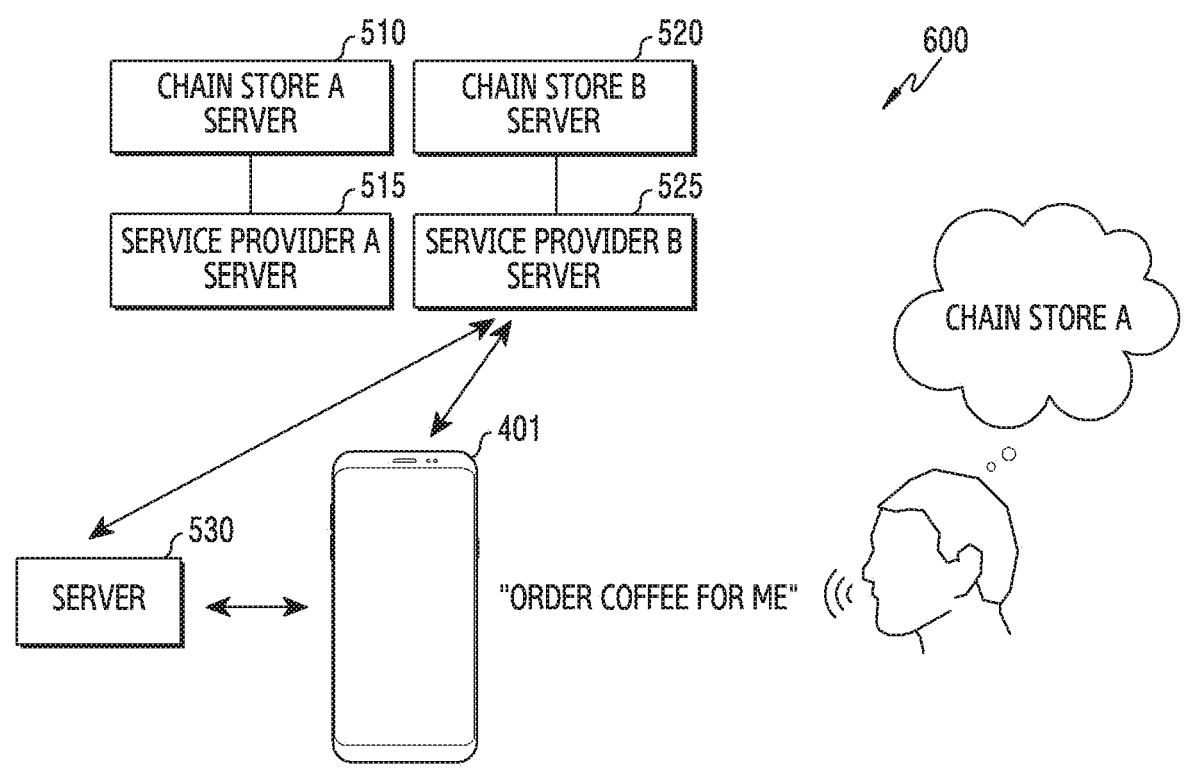
FIG. 6 is a diagram illustrating actions of a voice utterance processing system according to an embodiment of the disclosure.

FIG. 6 is a diagram illustrating actions of a voice utterance processing system according to an embodiment of the disclosure.

Referring to FIG. 6, a voice utterance processing system 600 may include an electronic device 401 and a server 530. In an embodiment, the electronic device 401 illustrated in FIG. 6 may correspond to the electronic device 401 illustrated in FIG. 5.

In an embodiment, the electronic device 401 may receive the user's voice utterance by using the microphone (not illustrated; for example, the microphone 120 of FIG. 1) included in the electronic device 401. For example, the electronic device 401 may receive analog voice signal data (for example, "order coffee for me") corresponding to the user's voice utterance.

In an embodiment, the electronic device 401 may transmit data regarding the received user voice utterance to the server 530, and may receive information regarding a response to the voice utterance from the server 530.

In an embodiment, the server 530 may generate and transmit response information by using (or analyzing) data regarding the voice utterance and, in connection with analyzing the data regarding the voice utterance, may confirm whether or not the voice utterance includes an explicit service domain name. For example, the server 530 may confirm that the voice utterance ("order coffee for me") does not include an explicit service domain name.

In an embodiment, when the voice utterance does not include an explicit service domain name, the server 530 may perform a designated action. For example, the server 530 may transmit a command to the electronic device 401 so as to output a message indicating that the service desired by the user cannot be provided, because the voice utterance does not include the service domain name. As another example, the server 530 may predict a service domain. The server 530 may indirectly determine the service domain on the basis of at least one of the type of words (or keywords) included in the data regarding the voice utterance, a combination of words, and the type of utilization of words. For example, the server 530 may determine a service domain (for example, a fourth service capsule administered by coffee chain company B) from multiple service domains capable of providing coffee ordering services (for example, a first service capsule administered by coffee chain company A and a fourth service capsule administered by coffee chain company B) on the basis of at least one of words (for example, "coffee" and "order") included in the data regarding the voice utterance and the type of utilization of words (for example, "order for me").

In an embodiment, the server 530 may perform at least one function by using at least a part of acquired voice recognition character data and information regarding one service domain determined by the server 530. For example, when the voice utterance does not include an explicit service domain name, the server 530 may access the service provider B server 525 by using the service domain determined by the server 530 (for example, the fourth service capsule administered by coffee chain company B), may generate information for ordering coffee, and may transmit the same to the accessed service provider B server 525.

If one service domain determined by the server 530 (for example, the fourth service capsule administered by coffee chain company B) is different from the service domain intended by the user (for example, the first service capsule administered by coffee chain company A), a function that is not desired by the user may be performed.

In order to prevent such a function not desired by the user from being performed when the voice utterance does not include an explicit service domain name, the server 530 may process the user voice utterance on the basis of a service domain selected or determined by the user in advance (hereinafter, referred to as "a selected service domain"). For example, the user can generate a setting that identifies the selected service domain for a particular function (e.g., beverages, etc.).

At least one action of the server 530 illustrated in FIG. 6 may be performed by the electronic device 401. For example, some of the actions illustrated in FIG. 6 as being performed by the server 530 may be performed by the electronic device 401, and the remaining may be performed by the server 530.

Figure 7:
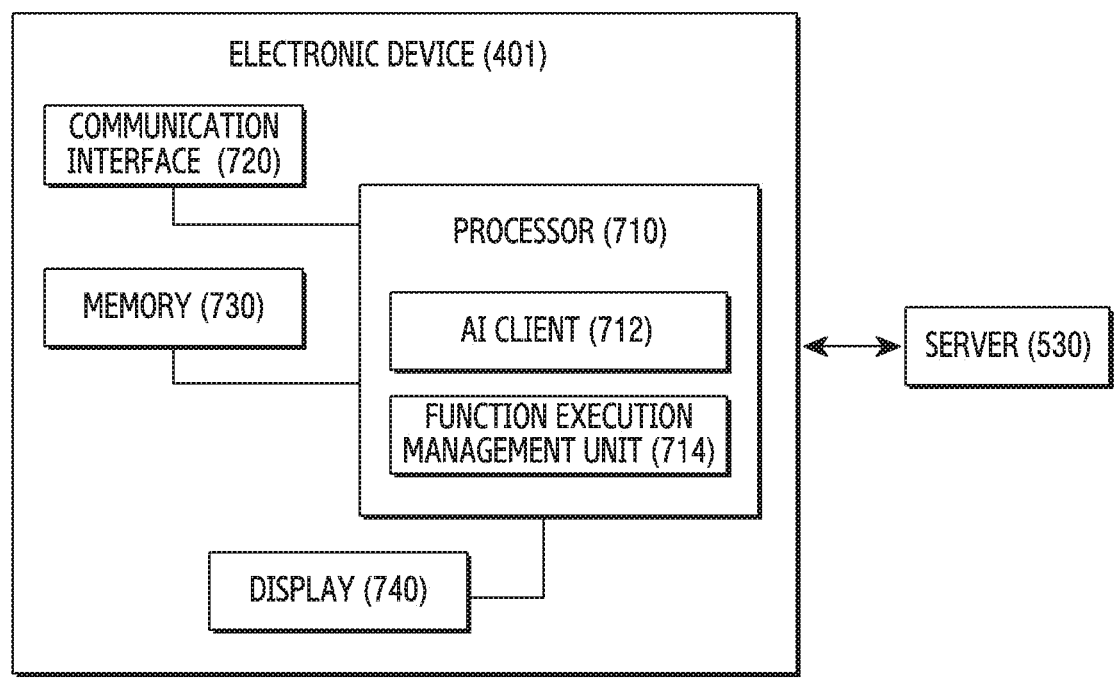
FIG. 7 is a diagram illustrating major components of an electronic device for processing a user voice utterance based on a selected service domain according to an embodiment of the disclosure.

FIG. 7 is a diagram illustrating major components of an electronic device for processing a user voice utterance based on a selected service domain according to an embodiment of the disclosure.

Referring to FIG. 7, a system for processing a user voice utterance on the basis of a selected service domain according to an embodiment will now be described. In the illustrated embodiment, the electronic device 401 of FIG. 7 may correspond to the electronic device 401 illustrated in FIG. 5 or to the user terminal 100 illustrated in FIG. 1, and the server 530 of FIG. 7 may correspond to the server 530 illustrated in FIG. 5.

In the illustrated embodiment, the electronic device 401 may include a processor 710, a communication interface 720, a memory 730, and a display 740. In an embodiment, the processor 710 may be connected to the communication interface 720, the memory 730, and the display 740 electrically or operatively. The processor 710 may control the communication interface 720, the memory 730, and the display 740, and may control the entire and overall action of the electronic device 401. In an embodiment, the processor 710 may include an AI client 712 and a function execution management unit 714.

In an embodiment, the AI client 712 may control the interaction with the user. For example, the AI client 712 may control the interaction with the user in connection with recognizing a voice utterance and providing a service corresponding to the recognized voice utterance. In an embodiment, the AI client 712 may correspond to the client module 151 illustrated in FIG. 1.

In an embodiment, the function execution management unit 714 may perform a function (or an action) that needs to be performed by the user terminal (for example, the electronic device 401) in order to provide a service corresponding to the user's voice utterance.

For example, when data regarding a voice utterance is processed by the server 530, the function execution management unit 714 may control the communication interface 720 to transmit the data regarding a voice utterance. The function execution management unit 714 may perform at least one function on the basis of response information received from the server 530 (or according to a command received from the server 530). When the voice utterance does not include an explicit service domain name, the function execution management unit 714 may additionally perform at least one function on the basis of information regarding a service domain (for example, a selected service domain) that is used to generate response information. For example, on the basis of reception of response information indicating that chain store A has successfully received a coffee order, the function execution management unit 714 may control the display 740 to display the above-mentioned content.

As another example, when data regarding a voice utterance is processed by the electronic device 401, the function execution management unit 714 may execute at least one application installed in the electronic device, or may perform at least one function related to a service capsule that is stored in the electronic device 401 or in an external device (for example, a capsule DB (for example, the capsule DB 230 of FIG. 1)). For example, the function execution management unit 714 may recognize a user voice utterance ("order coffee for me at chain store A") including an explicit service domain name, may determine a first service capsule administered by coffee chain company A, and may perform a coffee ordering function stored in the first service capsule.

Figure 8:
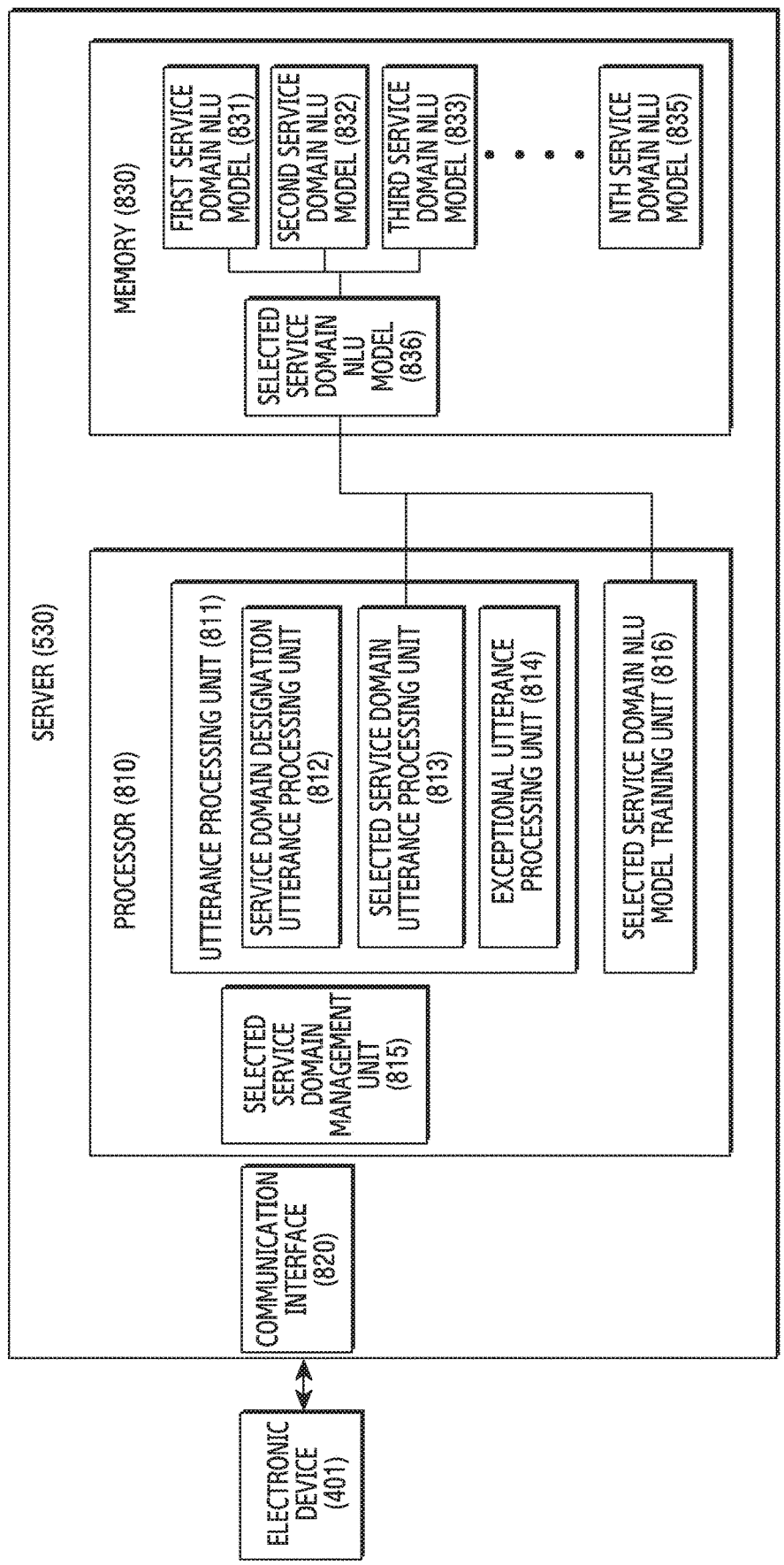
FIG. 8 is a diagram illustrating major components of a server for processing a user voice utterance on the basis of a selected service domain according to an embodiment of the disclosure.

As another example, when the function execution management unit 714 has recognized a user voice utterance ("order coffee for me") that does not include an explicit service domain name, the function execution management unit 714 may determine a predesignated selected service domain (for example, the first service capsule administered by coffee chain company A) as in the embodiment of FIG. 8, for example, and may perform a coffee ordering function stored in the first service capsule in order to process the user voice utterance on the basis of the determined selected service domain.

The function execution management unit 714 may manage a function (or an action) that needs to be performed by the user terminal (for example, the electronic device 401) in order to provide a service corresponding to the user's voice utterance. In an embodiment, the function execution management unit 714 may be included in the server 530, not in the electronic device 401.

In an embodiment, the communication interface 720 may be used by the electronic device 401 to communicate with an external device (for example, the server 530). The communication interface 720 illustrated in FIG. 7 may correspond to the communication interface 110 illustrated in FIG. 1. In an embodiment, the memory 730 may include a volatile memory and/or a nonvolatile memory. The memory 730 may correspond to the memory 150 illustrated in FIG. 1. In an embodiment, the memory 730 may store information regarding the history of at least one service provided by using a user voice utterance (for example, time information, the type of the provided service, and information regarding a service domain corresponding to the provided service).

In an embodiment, the memory 730 may store statistics information that may be generated from the history information (for example, information regarding the number of times or frequency of being provided with a service based on a specific service domain).

In an embodiment, the memory 730 may store information regarding selected service domains. In an embodiment, a selected service domain may be a service domain predesignated by the user such that the same will be used later to process a user voice utterance that does not include a service domain name. For example, the memory 730 may store information regarding at least one selected service domain determined on the basis of the user's input. For example, the memory 730 may store information regarding selected service domains such as "galleries," "stocks," and "coffee chain company A." As another example, the memory 730 may store information regarding one or more selected service domains that have been determined regardless of the user's input.

In an embodiment, the memory 730 may store an NLU model corresponding to a selected service domain, or an NLU model corresponding to a service domain that does not correspond to a selected service domain.

In an embodiment, the memory 730 may store at least one of the above-mentioned pieces of information in accordance with the user or user account.

In an embodiment, the display 740 may visually provide information to the user. The display 740 may be a touchscreen display capable of receiving a touch input from the user. The display 740 illustrated in FIG. 7 may correspond to the display 140 illustrated in FIG. 1.

In an embodiment, when a user voice utterance (for example, "order coffee for me") that does not include a service domain name is recognized, the display 740 may display, under the control of the processor 710, one or more service domain lists that support a coffee ordering service together with a message such as "please select a desired service domain."

In another embodiment, when a user voice utterance (for example, "order coffee for me") that does not include a service domain name is recognized, the display 740 may display, under the control of the processor 710, a message such as "coffee will be ordered by using selected service domain service C" or "coffee has been ordered by using selected service domain service C."

FIG. 8 is a diagram illustrating major components of a server for processing a user voice utterance on the basis of a selected service domain according to an embodiment of the disclosure.

Referring to FIG. 8, the server 530 may correspond to the server 530 illustrated in FIG. 5. In an embodiment, the server 530 may include a processor 810, a communication interface 820, and a memory 830. The communication interface 820 may be used by the server 530 to communicate with an external device (for example, the electronic device 401 of FIG. 5). For example, the server 530 may receive data regarding the user's voice utterance from the electronic device 401 by using the communication interface 820. As another example, the server 530 may convert voice signal data into text data, and may determine whether or not the converted text data includes an explicit service domain name. When no explicit service domain name is included, the server 530 may determine a selected service domain on the basis of a confidence score acquired by inputting a voice utterance to a separate model for determining the selected service domain or the user intent (hereinafter, referred to as "a selected service domain NLU model 836"). The server 530 may generate response information on the basis of the determined selected service domain, and may transmit the generated response information to the electronic device 401 by using the communication interface 820.

In an embodiment, the memory 830 may store NLU models 831 to 835 corresponding to one or more service domains, respectively. Referring to FIG. 8, the memory 830 is illustrated as storing NLU models corresponding to N service domains, respectively, and N may be a natural number equal to or larger than 1. A NLU model includes a set of information or a structure of information used for analysis for determining the intent of a user voice utterance and a parameter in accordance with a corresponding service domain.

In an embodiment, at least some (for example, 831 to 833) of the NLU models (for example, 831 to 835) may correspond to selected service domains, respectively. In this case, the remaining models 834 and 835 of the NLU models 831 to 835 may not correspond to any selected service domains (or may correspond to non-selected service domains).

In an embodiment, at least a part of at least one NLU model may be generated or designated by 3rd party service provider. Accordingly, a user voice utterance that can be processed by the first NLU model may also be processed by the second NLU model identically (or similarly). For example, a user voice utterance such as "order coffee for me" may be identically processed by the first NLU model corresponding to coffee chain company A or by the second NLU model corresponding to coffee chain company B. Such confusion of voice utterance processing between different service domains may be removed by a least one component (for example, the service domain designation utterance processing unit 812) included in the utterance processing unit 811.

In an embodiment, one NLU model (for example, the first service domain NLU model 831) may include at least one of an intent determination model and a parameter determination model.

In an embodiment, when an NLU model uses a rule-based algorithm, the NLU model may include rule information and a list of designated words. In another embodiment, when an NLU model uses a statistics-based algorithm, the NLU model may include a corresponding statistics model (for example, a neural network model, a hidden Markov model, or a finite state transducer).

In an embodiment, one NLU model may correspond to one service domain, or may correspond to one or more service domains.

In an embodiment, the memory 830 may store a separate model (for example, a selected service domain NLU model 836 for determining a selected service domain or user intent) that is distinguished from the NLU models 831 to 835. The selected service domain NLU model 836 may include at least one of a domain determination model, an intent determination model, or a parameter determination model. One selected service domain NLU model 836 may correspond to multiple NLU models 831 to 833, and each of the multiple NLU models 831 to 833 may correspond to a different selected service domain.

In an embodiment, the memory 830 may store information regarding an explicit service domain name. The processor 810 may store information regarding service domain names on the basis of the list of service capsules stored in the capsule DB (for example, the capsule DB 230 of FIG. 1) and the list of applications installed in the electronic device 401.

In an embodiment, the memory 830 may store information regarding a selected service domain. For example, the memory 830 may store information regarding one or more selected service domains determined on the basis of the user's input. As another example, the memory 830 may store information regarding one or more selected service domains determined regardless of the user's input.

In an embodiment, the memory 830 may store identification information of multiple client devices (for example, the electronic device 401) or the corresponding user's account information.

In an embodiment, the memory 830 may store information regarding history of being provided with at least one service by using a user voice utterance, or statistics information that can be acquired from the history information.

In an embodiment, the memory 830 may store at least one of the above-mentioned pieces of information in accordance with the user (or user account).

In an embodiment, the processor 810 may include an utterance processing unit 811, a selected service domain management unit 815, and a selected service domain NLU model training unit 816.

In an embodiment, the utterance processing unit 811 may process the user's voice utterance in a designated order and in a designated type. In an embodiment, the utterance processing unit 811 may include a service domain designation utterance processing unit 812, a selected service domain utterance processing unit 813, and an exceptional utterance processing unit 814.

In an embodiment, the service domain designation utterance processing unit 812 may confirm whether or not the user's voice utterance (for example, voice recognition text data) includes an explicit service domain name and, when the user's voice utterance includes an explicit service domain name, may process the user's voice utterance on the basis of a service domain (or an NLU model corresponding to the service domain) corresponding to the explicit service domain name. For example, when the user's voice utterance ("order coffee for me at chain store A" or "show me photos taken at the gallery yesterday") includes an explicit service domain name ("chain store A" or "gallery"), the service domain designation utterance processing unit 812 may interpret (or understand) the user's voice utterance by using the NLU model of the service domain corresponding to the included service domain name, and may determine the intent ("order") related to the user's voice utterance and the parameter that corresponds to the intent ("ordering target=coffee"). The service domain designation utterance processing unit 812 may generate response information on the basis of the determined intent and parameter, and may transmit the generated response information to the electronic device 401 through the communication interface 820. In an embodiment, the service domain designation utterance processing unit 812 may use a normal natural language processing method.

In an embodiment, the service domain designation utterance processing unit 812 may process the user's voice utterance on the basis of a predesignated syntactic rule. For example, when the user's voice utterance includes an explicit service domain name, but when the user's voice utterance does not correspond to a predesignated syntactic rule, the service domain designation utterance processing unit 812 may not process the use's voice utterance on the basis of a service domain corresponding to the explicit service domain name. For example, the predesignated syntactic rule may include "<utter command> at <service domain name>", "<utter command> with <service domain name>", "open <service domain name> and <utter command>", and "request <service domain name> to <utter command>." The service domain designation utterance processing unit 812 may load an NLU model of a service domain corresponding to <service domain name> and may determine the user's intent and parameter on the basis of the loaded NLU model (or by using an intent determination model or parameter determination model included in the loaded NLU model), thereby processing <utter command>.

In an embodiment, when the user's voice utterance does not include an explicit service domain name, the selected service domain utterance processing unit 813 may process the user's voice utterance on the basis of a confidence score acquired by inputting the voice input to a separate model (selected service domain NLU model 836) for determining a selected service domain.

For example, the selected service domain utterance processing unit 813 may determine a selected service domain to process the user's voice utterance on the basis of a confidence score acquired by inputting the voice utterance to the selected service domain NLU model 836, and may process the user's voice utterance on the basis of the determined selected service domain. The selected service domain utterance processing unit 813 may determine the selected service domain by using a domain determination model included in the selected service domain NLU model 836. The selected service domain utterance processing unit 813 may determine the selected service domain by using a confidence score acquired by inputting the voice utterance to a domain determination model implemented on the basis of a deep neural network (DNN). The selected service domain utterance processing unit 813 may determine, from one or more selected service domain, a selected service domain, from which a confidence score equal to or higher than a designated value has been acquired, as the selected service domain to process the user's voice utterance, and may process the user's voice utterance on the basis of the determined selected service domain.

As another example, the selected service domain utterance processing unit 813 may process the user's voice utterance by determining the intent and parameter corresponding to the voice utterance, by bypassing the action of determining the selected service domain to process the user's voice utterance, on the basis of a confidence score acquired by inputting the voice utterance to the selected service domain NLU model 836, as will be described later in more detail.

In an embodiment, when the user's voice utterance does not include an explicit service domain name, and when the use's voice utterance cannot be processed on the basis of the selected service domain, the exceptional utterance processing unit 814 may perform a designated action in response to the user's voice utterance.

In an embodiment, the exceptional utterance processing unit 814 may process a voice utterance, which does not include an explicit service domain name, and which cannot be processed on the basis of the selected service domain, on the basis of a non-selected service domain. The exceptional utterance processing unit 814 may process the voice utterance on the basis of commands or command rules designated by the objective of the designer of the electronic device 401 or the voice utterance processing system.

For example, the exceptional utterance processing unit 814 may determine, prior to outputting an error message, whether or not the user voice utterance corresponds to at least a part of service domains that do not correspond to selected service domains (hereinafter, referred to as non-selected service domains or normal service domains). When the user voice utterance corresponds to at least a part of a normal service domain, the exceptional utterance processing unit 814 may process the user voice utterance by using the NLU model of the normal service domain, and may generate response information to be provided to the user. In response to a case in which the user voice utterance does not correspond to at least a part of a normal service domain, the exceptional utterance processing unit 814 may transmit a command to the electronic device 401 so as to output an error message.

For example, the exceptional utterance processing unit 814 may use a method related to a confidence score in connection with determining whether or not the user voice utterance corresponds to at least a part of a normal service domain. For example, when the user voice utterance is made to correspond to NLUs of normal service domains, and when there is one normal service domain from which a confidence score equal to or higher than a designated value is confirmed, the exceptional utterance processing unit 814 may process the user voice utterance on the basis of the NLU of the normal service domain. As another example, when there is one normal service domain NLU from which a confidence score equal to or higher than a predesignated value is confirmed, and when the confidence score of the remaining normal service domain NLUs is equal to or lower than a predesignated second value, the exceptional utterance processing unit 814 may process the user voice utterance on the basis of the NLU of the normal service domain, the confidence score of which is equal to or higher than the first value.

In an embodiment, the exceptional utterance processing unit 814 may recommend the user to configure at least a part of a non-selected service domain as a selected service domain. For example, when the user voice utterance corresponds to at least a part of a non-selected service domain, the exceptional utterance processing unit 814 may transmit a command to the electronic device 401 so as to output a message that recommends configuration of at least a part of the non-selected service domain as a selected service domain.

In an embodiment, the service domain designation utterance processing unit 812, the selected service domain utterance processing unit 813, and the exceptional utterance processing unit 814 may operate in a designated order. For example, the service domain designation utterance processing unit 812 may initially determine whether or not the user's voice utterance includes an explicit service domain name. The selected service domain utterance processing unit 813 may operate in response to a determination made by the service domain designation utterance processing unit 812 that the user's voice utterance does not include an explicit service domain name. The exceptional utterance processing unit 814 may operate in response to a determination made by the selected service domain utterance processing unit 813 that the user's voice utterance cannot be processed on the basis of a selected service domain.

In an embodiment, the selected service domain management unit 815 may manage one or more selected service domains. In an embodiment, the selected service domains may be included in N service domains corresponding to N NLU models 831 to 835 stored in the memory 830. For example, the selected service domains may correspond to M service domains, which are part of the N service domains (M<N).

In an embodiment, in order to improve the intent determination performance of the voice utterance processing system, only a designated number of selected service domains may be allowed.

In an embodiment, the selected service domain management unit 815 may manage selected service domains on the basis of user input data received through the communication interface 820. For example, the selected service domain management unit 815 may add a service domain that does not corresponds to a selected service domain (hereinafter, referred to as a non-selected service domain) as a selected service domain or may add a service domain that corresponds to a selected service domain as a non-selected service domain, on the basis of user input data received through the communication interface 820.

In an embodiment, the selected service domain management unit 815 may manage a selected service domain for each of multiple users (or multiple electronic devices). For example, the selected service domain management unit 815 may separately manage M1 selected service domains corresponding to user A and M2 selected service domains corresponding to user B. The selected service domain management unit 815 may manage a selected service domain for each of multiple users by using identification information of the electronic device 401 or user account information.

In an embodiment, the selected service domain management unit 815 may manage a user interface for adding a non-selected service domain as a selected service domain and a user interface for configuring no more selected service domains. The selected service domain management unit 815 may control and manage the flow of related actions.

In an embodiment, the selected service domain NLU model training unit 816 may train a selected service domain NLU model 836. For example, the selected service domain NLU model training unit 816 may receive information regarding a service domain that been newly added as a selected service domain from the selected service domain management unit 815, and may retrieve an NLU model corresponding to the added service domain from the memory 830. The selected service domain NLU model training unit 816 may train a selected service domain NLU model 836 by using the information regarding an added service domain (for example, utterance information, utterance rule, and vocabulary dictionary). The selected service domain NLU model training unit 816 may vary the training method according to the type of the selected service domain NLU model 836. For example, when the selected service domain NLU model 836 includes only a domain determination model, the selected service domain NLU model training unit 816 may train only the domain determination model.

In an embodiment, although not illustrated, the utterance processing unit 811 may include a function designation utterance processing unit (not illustrated). In an embodiment, the function designation utterance processing unit may operate after the service domain designation utterance processing unit 812 operates and before the selected service domain utterance processing unit 813 operates. For example, the function designation utterance processing unit may operate in response to a determination made by the service domain designation utterance processing unit 812 that the user's voice utterance does not include an explicit service domain name. The function designation utterance processing unit may determine whether or not the user's voice utterance, which does not include an explicit service domain name, corresponds to a function designation utterance. In an embodiment, the function designation utterance may refer to an utterance including one or more phrases (or a combination of one or more words) predesignated to perform an action or a function that occurs in the physical world. For example, a function designation utterance corresponding to a pizza ordering function may be an utterance including a phrase among "deliver a pizza", "order a pizza", and "I want to eat pizza." The function designation utterance may have been determined regardless of the user input. For example, the function designation utterance may be predetermined by the manufacturer (or engineer) of the electronic device 401 or the manufacturer (or engineer) of the user voice recognition system.

In an embodiment, in response to a determination made by the function designation utterance processing unit that the user's voice utterance does not correspond to a function designation utterance, the selected service domain utterance processing unit 813 may determine whether or not the user's voice utterance can be processed on the basis of a selected service domain.

In an embodiment, at least part of the components included in the processor 810 or at least part of the components included in the memory 830 may be included in the electronic device 401. For example, when the utterance processing unit 811 is included in the processor (for example, the processor 710 of FIG. 7) of the electronic device 401, the processor 710 of the electronic device 401 may not transmit the user's voice utterance received from the microphone of the electronic device 401 to the server 530, and may directly process the same. For example, when the user's voice utterance does not include a predesignated service domain name, the processor 710 of the electronic device 401 may determine a selected service domain and may process the user's voice utterance on the basis of the determined selected service domain.

Figure 9:
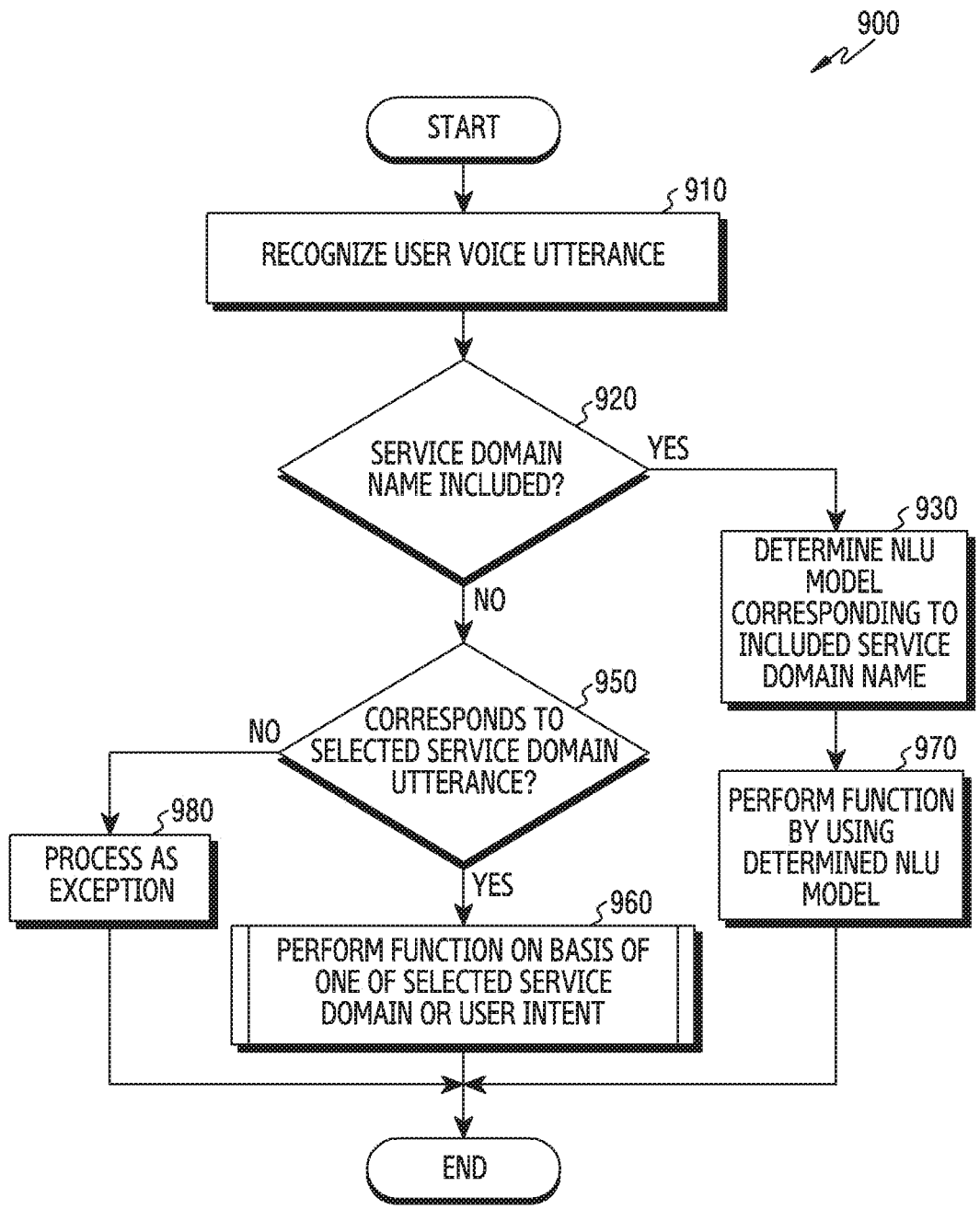
FIG. 9 illustrates a method of a voice utterance processing system for processing a user voice utterance according to an embodiment of the disclosure.

FIG. 9 illustrates a method of a voice utterance processing system for processing a user voice utterance according to an embodiment of the disclosure.

Referring to FIG. 9, a method 900 may be performed by an electronic device (for example, the electronic device 401 of FIG. 5) or by a processor (for example, the processor 710 of FIG. 7) of the electronic device 401. Alternatively, the operations illustrated in FIG. 9 may be performed by a server (for example, the server 530 of FIG. 5) or by a processor (for example, the processor 810 of FIG. 8) of the server 530. Alternatively, the operations illustrated in FIG. 9 may be performed by a voice utterance processing system (for example, the voice utterance processing system 500) including the electronic device 401 and the server 530. It will be assumed in the following description that the operations illustrated in FIG. 9 are performed by the voice utterance processing system 500. In this case, the subject that performs at least one of the operations illustrated in FIG. 9 may be the processor 710 or the processor 810.

In an embodiment, in operation 910, the processor 710 may recognize a user voice utterance. For example, the processor 710 may recognize a user voice utterance such as "order coffee for me at chain store A." The processor 710 may receive an electric signal, into which user voice utterance data has been converted, from a microphone (for example, the microphone 120 of FIG. 1). In an embodiment, the processor 710 may transmit the user voice utterance data to the server 530.

In an embodiment, the processor 810 may acquire voice recognition text data into which the user voice utterance data has been converted. For example, the processor 810 may acquire voice recognition text data by using an ASR module (for example, the ASR module 221 of FIG. 1) included in the server 530.

In an embodiment, in operation 920, the processor 810 may confirm whether or not the user voice utterance ("order coffee for me at chain store A") includes an explicit service domain name ("chain store A"). In an embodiment, the processor 810 may confirm whether or not the user voice utterance includes an explicit service domain name by using the voice recognition text data and information regarding service domain names stored in a memory (for example, the memory 830 of FIG. 8).

In an embodiment, when the user voice utterance includes an explicit service domain name (i.e., yes in operation 920), the processor 810 may determine a NLU model of a service domain (for example, the first service capsule administered by coffee chain company A) corresponding to the included service domain name ("chain store A") in operation 930. In an embodiment, when two or more explicit service domain names are detected from the user voice utterance, the processor 810 may determine NLU models of service domains corresponding to the two or more detected service domain names, respectively, and may determine one NLU model from the determined NLU models of service domains. For example, the processor 810 may determine one NLU model from the determined NLU models of service domains on the basis of the user preference and the association with the remaining part other than a predesignated service domain name.

In an embodiment, in operation 970, the processor 810 may perform at least one function by using the determined NLU model. In an embodiment, the processor 810 may determine the user's intent by using at least a part of the user voice utterance and the determined NLU model, and may perform at least one function related to the service domain corresponding to the determined NLU model according to the determined intent. For example, when the NLU model of a service domain (for example, the first service capsule of coffee chain company A) corresponding to the service domain name included in the voice utterance is determined in operation 930, the processor 810 may determine the user's intent ("order") and a specific parameter ("ordering target=coffee") by using the confirmed NLU model and the remaining part of the user voice utterance other than the service domain name, and may perform at least one function (generating order information and transmitting the same to a server corresponding to coffee chain company A) on the basis of the determined intent and parameter.

In an embodiment, when no explicit service domain name is detected from the user voice utterance (i.e., no in operation 920), the processor 810 may confirm, in operation 950, whether or not the user voice utterance corresponds to a selected service domain utterance. In an embodiment, the selected service domain may be a service domain predesignated by the user to be used later to process a user voice utterance including no service domain name. In an embodiment, the processor 810 may analyze the voice utterance (voice signal or text) on the basis of a selected service domain NLU model 836, and may acquire a confidence score with regard to each intent or each service domain, which can be processed in a selected service domain. In another embodiment, the processor 810 may input the voice utterance to the selected service domain NLU model 836 to acquire a confidence score with regard to each intent or each service domain, which can be processed in a selected service domain. The processor 810 may confirm whether or not the user voice utterance corresponds to a selected service domain utterance on the basis of the confidence score. The confidence score with regard to each intent may be acquired by analyzing the voice utterance on the basis of an intent determination model included in the selected service domain NLU model 836, and the confidence score with regard to each service domain may be acquired by analyzing the voice utterance on the basis of a domain determination model included in the selected service domain NLU model 836.

In an embodiment, when the user voice utterance does not correspond to a selected service domain utterance (i.e., no in operation 950), the processor 710 may control the input/output interface, in response to a command from the server 530, so as to output a message indicating that the user voice utterance cannot be processed on the basis of any service domain (hereinafter, referred to as "an error message") in operation 980. For example, the processor 710 may output a voice message through a speaker (for example, the speaker 130 of FIG. 1) or visually display a message through a touchscreen display (for example, the display 140 of FIG. 1).

Although not illustrated, when the user voice utterance does not correspond to a selected service domain utterance (i.e., no in operation 950), the processor 810 may determine, in operation 980, whether or not the user voice utterance corresponds to at least a part of a non-selected service domain (or a normal service domain), prior to outputting an error message. The processor 710 may determine a service domain to which the user voice utterance belongs, among normal service domains, and may determine the intent and parameter on the basis of the intent determination model and the parameter determination model included in the determined service domain. When the service domain to which the user voice utterance belongs cannot be determined among the normal service domains either, an error message (for example, "incomprehensible command") may be displayed.

In an embodiment, when the user voice utterance corresponds to a selected service domain utterance (i.e., yes in operation 950), the processor 810 may perform at least one function on the basis of one of the determined selected service domain or the determined user intent in operation 960. The processor 810 may determine a selected service domain that is to be used to process the voice utterance, or the user intent related to the voice utterance, by using the confidence score acquired in operation 950, and may perform at least one function on the basis of one of the determined selected service domain or the determined user intent. For example, when it is determined that the user intent related to the voice utterance is "order coffee", the processor 810 may transmit order information to a server corresponding to an arbitrary coffee chain company or a coffee chain company determined according to a preconfigured standard, in order to execute the intent "order coffee."

Figure 10:
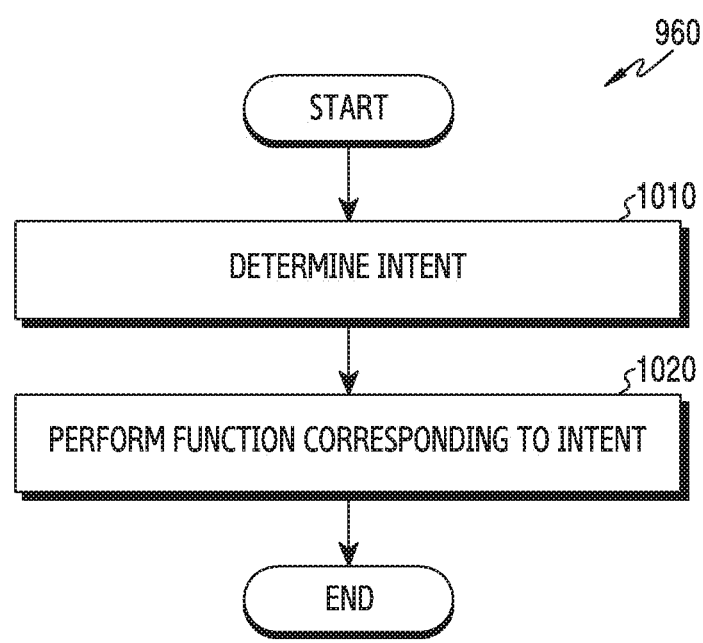
FIG. 10 illustrates a method of a voice utterance processing system for performing at least one function based on a user intent according to an embodiment of the disclosure.

FIG. 10 illustrates a method of a voice utterance processing system for performing at least one function based on a user intent according to an embodiment of the disclosure.

The operations illustrated in FIG. 10 may correspond to a detailed flow chart of operation 960 or operations 950 and 960 illustrated in FIG. 9.

Referring to FIG. 10, in operation 1010, the processor 810 may determine (or identify) the user's intent, which corresponds to an action to take based on a command in the user utterance. In order to determine whether or not the user's voice utterance corresponds to a selected service domain utterance, the processor 810 may input the voice utterance to an intent determination model included in the selected service domain NLU model 836, as described above. The processor 810 may determine the user's intent on the basis of a confidence score acquired by inputting the voice utterance to the intention determination model. For example, the processor 810 may acquire confidence scores corresponding to different intents, respectively, by inputting the voice utterance to the intent determination model, and may determine a user intent corresponding to a confidence score equal to or higher than a designated value as the user intent related to the voice utterance.

In an embodiment, the processor 810 may determine that a user intent corresponding to the highest confidence score, although the same may be smaller than the designated value, among multiple confidence scores corresponding to different intents, respectively, is the user intent related to the voice utterance.

In another embodiment, when a confidence score equal to or higher than the designated value is not confirmed, the processor 810 may not proceed to operation 1020. For example, as in operation 980 in FIG. 9, the processor 810 may transmit a command to the electronic device 401 so as to output an error message because the meaning (or intent) of the voice utterance cannot be understood. As another example, the processor 810 may attempt to determine a selected service domain on the basis of a confidence score acquired by inputting the voice utterance to a domain determination model, not to an intent determination model. As another example, the processor 810 may confirm whether or not the user's voice utterance corresponds to a normal service domain utterance (or a non-selected service domain utterance). In this case, when the user's voice utterance does not correspond to a normal service domain utterance, the processor 810 may transmit a command to the electronic device 401 so as to output an error message because the meaning of the voice utterance cannot be understood.

In another embodiment, when multiple confidence stores higher than the designated value are confirmed, the processor 810 may determine the user intent corresponding to the highest confidence score as the user intent related to the voice utterance, and may determine that a user intent corresponding to a confidence score among the same is the user intent related to the voice utterance, on the basis of a future user input.

In an embodiment, when a confirmed confidence score is higher than the designated value, the processor 810 may determine a parameter that corresponds to the user's intent. The processor 810 may determine a parameter by using a parameter determination model included in the selected service domain NLU model 836, and the parameter determination model may be based on a DNN. In an embodiment, the parameter may be used to specifically limit at least one function (or at least one service to be provided) that is to be performed on the basis of the user's intent determined in operation 1010. For example, when at least one function to be performed on the basis of the user's intent in operation 1010 is "ordering coffee", the parameter may be at least one of the coffee type (for example, iced Americano), the coffee size (for example, Grande), and other options (for example, additional shots).

In an embodiment, in operation 1020, the processor 810 may perform a function corresponding to the determined intent. For example, the processor 810 may perform at least one function for executing the determined intent ("ordering coffee"). The processor 810 may generate order information and transmit the same to a server corresponding to an arbitrary coffee chain company or a coffee chain company determined according to a preconfigured standard (for example, the coffee chain company frequented by the user recently, or a coffee chain company corresponding to a store closest to the user's current location).

In an embodiment, the processor 810 may transmit information regarding a response to the user utterance to the electronic device 401. For example, the processor 810 may transmit, to the electronic device 401, response information indicating that the coffee order has been successfully placed, on the basis of an acknowledgement message received after the order information is transmitted.

Figure 11:
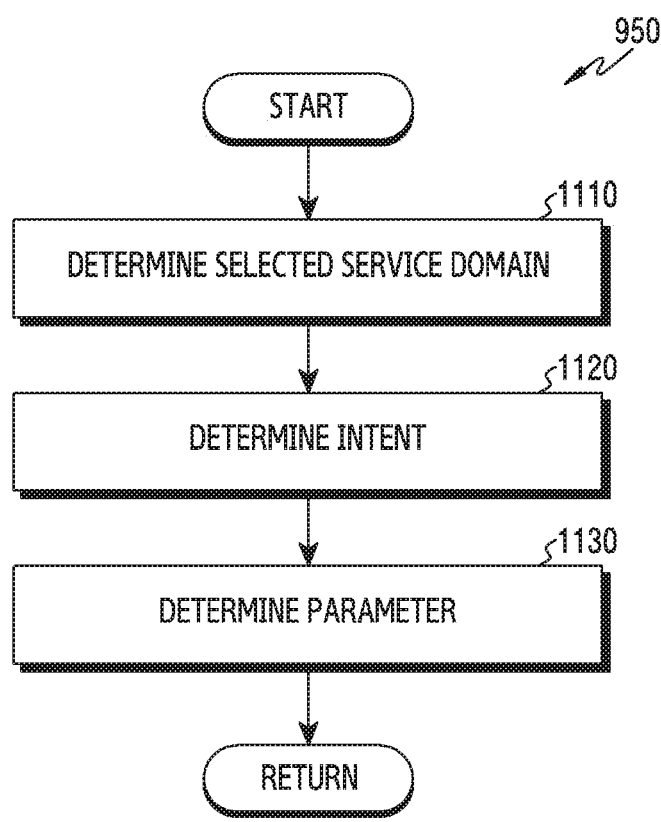
FIG. 11 illustrates a method of a voice utterance processing system for performing at least one function based on a selected service domain according to an embodiment of the disclosure.

FIG. 11 illustrates a method of a voice utterance processing system for performing at least one function based on a selected service domain according to an embodiment of the disclosure.

The operations illustrated in FIG. 11 may correspond to a detailed flow chart of operation 950 illustrated in FIG. 9.

Referring to FIG. 11, in operation 1110, the processor 810 may determine a selected service domain. In order to determine whether or not the user's voice utterance corresponds to a selected service domain utterance, the processor 810 may input the voice utterance to a domain determination model included in the selected service domain NLU model, as described above. The processor 810 may determine a selected service domain on the basis of a confidence score acquired by inputting the voice utterance to the domain determination model. For example, the processor 810 may acquire confidence scores corresponding to different selected service domains, respectively, by inputting the voice utterance to the domain determination model, and may determine a selected service domain corresponding to a confidence score equal to or higher than a designated value as the selected service domain to be used to process the voice utterance. In an embodiment, the domain determination model may be generated on the basis of information regarding selected service domains stored in the memory 830.

In an embodiment, the processor 810 may determine that a selected service domain corresponding to the highest confidence score, although the same may be smaller than the designated value, among multiple confidence scores corresponding to different selected service domains, respectively, is the selected service domain to be used to process the voice utterance.

In another embodiment, when a confidence score equal to or higher than the designated value is not confirmed, the processor 810 may not proceed to operation 1120. For example, as in operation 980 in FIG. 9, the processor 810 may transmit a command to the electronic device 401 so as to output an error message because the meaning of the voice utterance cannot be understood (or there is no selected service domain corresponding to the voice utterance). As another example, the processor 810 may attempt to determine the user's intent on the basis of a confidence score acquired by inputting the voice utterance to an intent determination model, not to a domain determination model.

In another embodiment, when multiple confidence scores higher than the designated value are confirmed, the processor 810 may determine the selected service domain corresponding to the highest confidence score as the selected service domain to be used to process the voice utterance, and may determine, on the basis of the user's future input, that a selected service domain corresponding to a confidence score among the same is the selected service domain to be used to process the voice utterance.

In an embodiment, in operation 1120, the processor 810 may determine the user's intent. The processor 810 may determine the user's intent on the basis of the selected service domain determined in operation 1110. For example, the processor 810 may determine the user's intent by using an intent determination model corresponding to the selected service domain determined in operation 1110 (or NLU model corresponding to the selected service domain determined in operation 1110 (for example, the intent determination model included in the first service domain NLU model 831)).

In an embodiment, in operation 1130, the processor 810 may determine a parameter. In an embodiment, the parameter may be used to specifically limit at least one function (or at least one service to be provided) that is to be performed on the basis of the user's intent determined in operation 1120.

In an embodiment, in operation 1130, the processor 810 may determine a parameter by using the selected service domain determined in operation 1110. For example, the processor 810 may determine the parameter by using a parameter determination model corresponding to the selected service domain determined in operation 1110 (or a parameter determination model included in the NLU model corresponding to the selected service domain determined in operation 1110).

In an embodiment, the parameter determined in operation 1130 may be additionally used by the processor 810 to perform at least one function associated with the user voice utterance.

Figure 12:
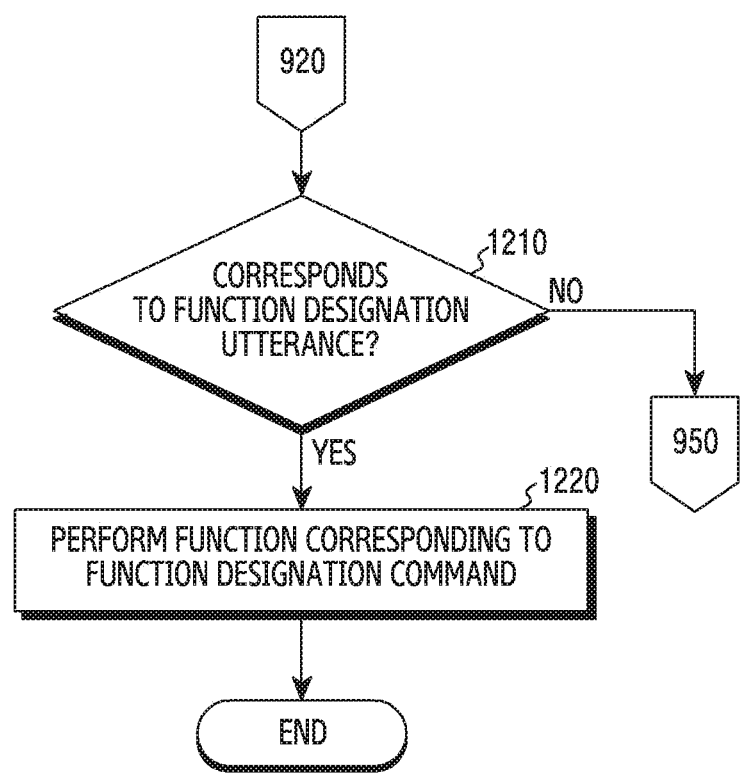
FIG. 12 illustrates a method of a voice utterance processing system for processing a user voice utterance according to an embodiment of the disclosure.

FIG. 12 illustrates a method of a voice utterance processing system for processing a user voice utterance according to an embodiment of the disclosure.

The operations illustrated in FIG. 12 may indicate operations that may be performed between operation 920 and operation 950 of FIG. 9.

Referring to FIG. 12, in operation 1210, the processor 810 may determine whether or not the user voice utterance corresponds to a function designation utterance. In an embodiment, the function designation utterance may refer to one or more phrases (or a combination of one or more words) predesignated to perform a specific function. The function designation utterance may have been determined regardless of the user input. For example, a function designation utterance corresponding to a pizza ordering function may be one of "deliver a pizza", "order a pizza", and "I want to eat pizza." That is, with regard to a designated command or command rule, a designated intent may have been mapped. In an embodiment, the mapping or operation 1210 may be implemented by a rule-based NLU algorithm, or may be implemented by a statistics-based algorithm (DNN, hidden Markov model (HMM), decision tree, support vector machine (SVM), or the like).

In an embodiment, when the user voice utterance does not correspond to a function designation utterance (i.e., no in operation 1210), the processor 810 may perform operation 950.

In an embodiment, when the user voice utterance corresponds to a function designation function (i.e., yes in operation 1210), the processor 710 may perform a function corresponding to a function designation command in operation 1220. Alternatively, the processor 810 may transmit a command to the electronic device 401 such that the processor 710 performs a function corresponding to the function designation command.

For example, the processor 710 may output a message such as "please select a desired service (or service domain)", and may output a list of service domains that support a pizza ordering function. The processor 710 may await the user's additional command.

Figure 13:
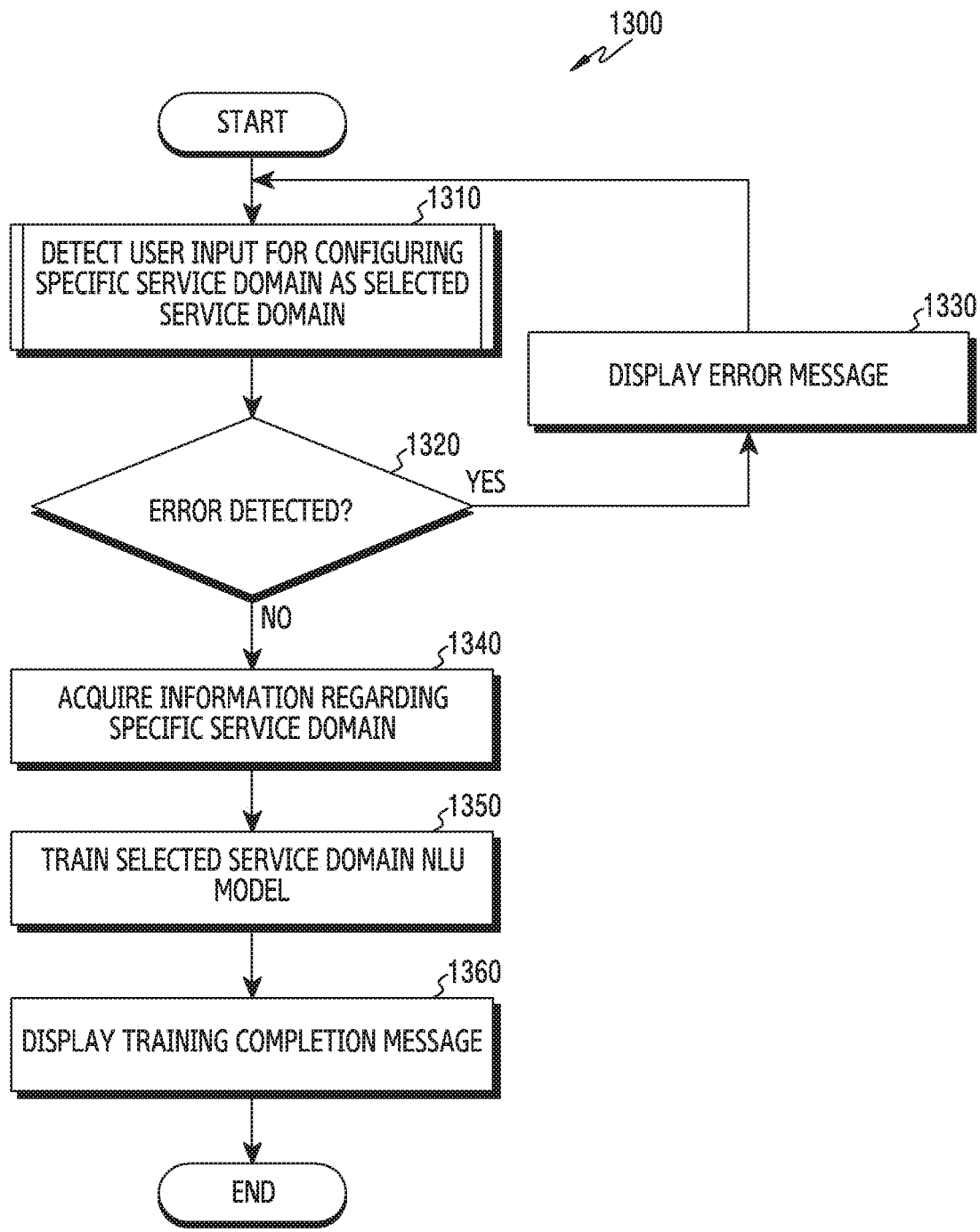
FIG. 13 illustrates a method of a voice utterance processing system for training a selected service domain natural language understanding (NLU) model according to an embodiment of the disclosure.

FIG. 13 illustrates a method of a voice utterance processing system for training a selected service domain NLU model according to an embodiment of the disclosure.

Referring to FIG. 13, a method 1300 may be performed in the process of adding a service domain that is not a selected service domain (also referred to as a non-selected service domain) as a selected service domain in response to detection of a predesignated event. The operations illustrated in FIG. 13 may be performed prior to operation 910. The operations illustrated in FIG. 13 may independently constitute an embodiment, or may constitute an embodiment while performing the operations illustrated in FIG. 9.

Although it will be assumed in the following description that some of the operations illustrated in FIG. 13 are performed by a processor (for example, the processor 810 of FIG. 8) of a server (for example, the server 530 of FIG. 8), the same may also be performed by a processor (for example, the processor 710 of FIG. 7) of an electronic device (for example, the electronic device 401 of FIG. 7).

In operation 1310, the processor 710 may detect a user input for configuring a specific service domain as a selected service domain.

In an embodiment, while a service related to a specific service domain is provided to the user, the processor 710 may detect a user input for configuring the specific service domain as a selected service domain. For example, while a service related to coffee chain store A is provided through a graphic user interface, the processor 710 may detect a user input related to a specific object included in the graphic user interface.

Although not illustrated, the processor 710 may configure a specific service domain as a selected service domain regardless of the user input. For example, on the basis of the user's use pattern (or use history), the processor 710 may configure a specific service domain as a selected service domain regardless of the user input. As a specific example, if the number of times coffee has been ordered through a service related to coffee chain company A for a predetermined period from the present time exceeds a predetermined number, the processor 710 may select the service domain related to coffee chain company A as a selected service domain.

Although not illustrated, the processor 710 may transmit data regarding a specific service domain related to the user input to the server 530.

In operation 1320, the processor 810 may confirm whether or not an error is detected. In an embodiment, the processor 810 may confirm whether or not a specific service domain can be configured as a selected service domain and, if the specific service domain cannot be configured as a selected service domain, may determine that an error has been detected.

In an embodiment, when a different service domain which belongs to the same category as the specific service domain and which can perform almost the same function as the specific service domain has already been configured as a selected service domain, the processor 810 may determine that an error has been detected because the specific service domain cannot be configured as a selected service domain.

For example, the processor 810 may determine that an error has been detected if a user input for configuring a service domain related to coffee chain company A as a selected service domain is detected while a service domain related to coffee chain company B has been configured as a selected service domain. As another example, the processor 810 may determine that an error has been detected if a user input for configuring a service domain related to moving image streaming platform Z as a selected service domain is detected while a service domain related to moving image streaming platform Y has been configured as a selected service domain.

Although not illustrated, the processor 810 may transmit the content of the detected error (for example, the cause of the error and how to solve the error) and a command for outputting the content of the detected error to the electronic device 401.

In an embodiment, when an error is detected (i.e., yes in operation 1320), the processor 710 may display an error message on the display (for example, the display 140 of FIG. 1) in operation 1330. The processor 710 may additionally display, in the error message, the cause of the error and how to solve the error. For example, if a user input for configuring a service domain related to coffee chain company A as a selected service domain is detected while a service domain related to coffee chain company B has been configured as a selected service domain, the processor 710 may display, on the display 140, an error message indicating that the service domain related to coffee chain company A cannot be configured as a selected service domain because the service domain related to coffee chain company B is currently configured as a selected service domain, and the service domain related to coffee chain company A can be configured as a selected service domain if the service domain related to coffee chain company B, which is currently configured as a selected service domain, is selected as a non-selected service domain.

In an embodiment, the processor 710 may perform operation 1310 again after displaying an error message. In an embodiment, the processor 710 may display an error message and then detect a user input for configuring a specific service domain as a selected service domain. In another embodiment, the processor 710 may receive a user input for configuring the service domain related to coffee chain company B, which is currently configured as a selected service domain, as a non-selected service domain, and for configuring the service domain related to coffee chain company A as a selected service domain.

In an embodiment, when no error is detected (i.e., no in operation 1320), the processor 810 may acquire information regarding a specific service domain in operation 1340. In an embodiment, the processor 810 may acquire information regarding a specific service domain related to a user input, in order to train a selected service domain NLU model 836. For example, the processor 810 may acquire information regarding a specific service domain, such as utterance information, utterance rules, and vocabulary dictionaries. For example, the processor 810 may acquire, as information regarding a service domain related to coffee chain company A, information regarding the official name of one or more services provided by coffee chain company A (for example, my own menu, easy order, and siren order), the official name of one or more menus (for example, iced Americano and Java chip Frappuccino), the name used when one or more services or menus are called by users (i.e., unofficial names or nicknames), and various utilization rules regarding how the name is used when called by users in the case of a user utterance.

In an embodiment, the processor 810 may train a selected service domain NLU model 836 in operation 1350.

In an embodiment, the processor 810 may vary the training method according to the type of implementation of the selected service domain NLU model 836. For example, when the selected service domain NLU model 836 includes only a domain determination model, the processor 810 may train only the domain determination model. As another example, when the selected service domain NLU model 836 does not include a domain determination model but includes an intent determination model (or an intent determination model and a parameter determination model), the intent determination model (or the intent determination model and the parameter determination model) may be trained.

In an embodiment, the processor 810 may train the selected service domain NLU model 836 on the basis of information regarding a specific service domain acquired in operation 1340. For example, the processor 810 may generate various utterance samples corresponding to various intents by using information regarding a specific service domain (for example, utterance information corresponding to various intents, utterance rules, and vocabulary dictionaries), and may train an intent determination model which is included in the selected service domain NLU model 836, and which is implemented in a DNN type, by using the generated utterance samples. In this case, the intent determination model has the purpose of receiving an utterance sample and determining the intent, and may be trained on the basis of a backpropagation algorithm.

In an embodiment, when the selected service domain NLU model 836 includes a domain determination model, an intent determination model, and a parameter determination model, the selected service domain NLU model 836 may be generated solely by updating the domain determination model. In this case, the processor 810 may generate or collect utterance samples corresponding to a specific service domain, and may train a DNN type domain determination model implemented on the basis thereof. In an embodiment, another type of model such as a statistics model or a rule model can be used in place of the DNN type.

In an embodiment, the processor 810 may train the selected service domain NLU model 836 to use one or more already-existing NLU models (for example, the first service domain NLU model 831 to the $N^{th}$ service domain NLU model 835 in FIG. 8) without modification. For example, a voice utterance may be input in one or more already-existing NLU models 831 to 835 respectively (or in a parallel manner). Each of the one or more already-existing NLU models 831 to 835 may output a user intent and a confidence score, and the selected service domain NLU model 836 may be trained to select a user intent having the highest confidence score. In this case, the selected service domain NLU model 836 may include the NLU model (or a combination of NLU models) that has output the selected user intent.

In an embodiment, the processor 810 may transmit information regarding training of the selected service domain NLU model 836 to the electronic device 401.

In an embodiment, the processor 710 may display a guide message related to training of the selected service domain NLU model 836. For example, while the processor 810 trains the selected service domain NLU model 836, the processor 710 may display a guide message indicating that the selected service domain NLU model 836 is being trained, in response to a user input that is input in operation 1310.

In an embodiment, when no error is detected (i.e., no in operation 1320), the processor 810 may perform operation 1340 and operation 1350 after a predesignated time passes (or at a predesignated time (for example, 3 o'clock AM). This is because the operation of acquiring information regarding a specific service domain and training the selected service domain NLU model 836 on the basis of the acquired information may take a long time. The processor 710 may display a guide message that indicates this fact. For example, the processor 710 may display a guide message indicating that information regarding a specific service domain will be acquired at 3 o'clock AM, and the selected service domain NLU model 836 will be trained.

In an embodiment, the processor 710 may display a train completion message in operation 1360. For example, the processor 710 may display a message so as to inform that training of the selected service domain NLU model 836 is completed, and a user utterance including no explicit service domain name, which will be input later, may be processed on the basis of the trained selected service domain NLU model 836.

Figure 14:
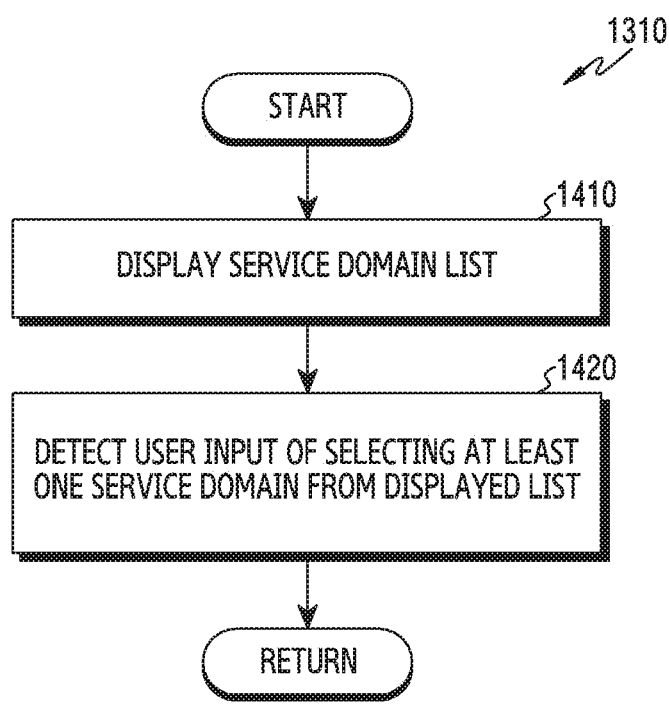
FIG. 14 illustrates a method of a voice utterance processing system for detecting a user input for configuring a specific service domain as a selected service domain according to an embodiment of the disclosure.

FIG. 14 illustrates a method of a voice utterance processing system for detecting a user input for configuring a specific service domain as a selected service domain according to an embodiment of the disclosure.

The operations illustrated in FIG. 14 may correspond to a detailed flow chart of operation 1310 illustrated in FIG. 13.

Referring to FIG. 14, in operation 1410, the processor 710 may display a service domain list. In an embodiment, the processor 710 may display a service domain list including multiple service domains on the display 140.

In an embodiment, the processor 710 may classify the multiple service domains according to a predetermined reference (for example, a category), and may display the classified service domains. For example, the processor 710 may classify the multiple service domains according to whether or not the same are installed in the electronic device 401 in an application type. As another example, the processor 710 may classify the multiple service domains according to the attribute of the provided service (for example, ordering or delivery service) or the content of the provided service (for example, in the case of an ordering or delivery service, the target of the order or delivery).

In another embodiment, the processor 710 may align the multiple service domains according to a predetermined standard and may display the aligned service domains. For example, the processor 710 may align the multiple service domains according to the number of times the same are used during a designated time interval, and may display the aligned service domains.

In operation 1420, the processor 710 may detect a user input of selecting at least one service domain from the displayed list. In another embodiment, the processor 710 may receive an additional user input for selecting at least one service domain from the displayed list and configuring the selected service domain as a selected service domain.

In another embodiment, when multiple service domains are classified according to a predetermined standard, the processor 710 may vary the number of service domains that can be selected from the one or more service domains that have been classified into the same category according to a predetermined standard.

For example, when multiple service domains are classified according to whether or not the same are installed in the electronic device 401 in an application type, the processor 710 may receive selection of two or more service domains from one or more service domains classified into the same category.

As another example, when multiple service domains are classified according to the attribute of the provided service or the content thereof, only one service domain may be selected from one or more service domains classified into the same category. As a specific example, upon detecting a user input for selecting one service domain (for example, a service domain related to coffee chain company A) from one or more service domains (for example, a service domain related to coffee chain company A and a service domain related to coffee chain company B) classified into the same category (for example, coffee or beverage), the processor 710 may control the display 140 such that the remaining service domains of the one or more service domains classified into the same category cannot be selected. For example, the display 140 may be controlled to deactivate the object for selecting the remaining service domains. In another embodiment, the embodiment may be implemented such that the processor 710 allows selection of two or more service domains from the one or more service domains classified into the same category, and detects an error in operation 1320 of FIG. 13.

Figure 15:
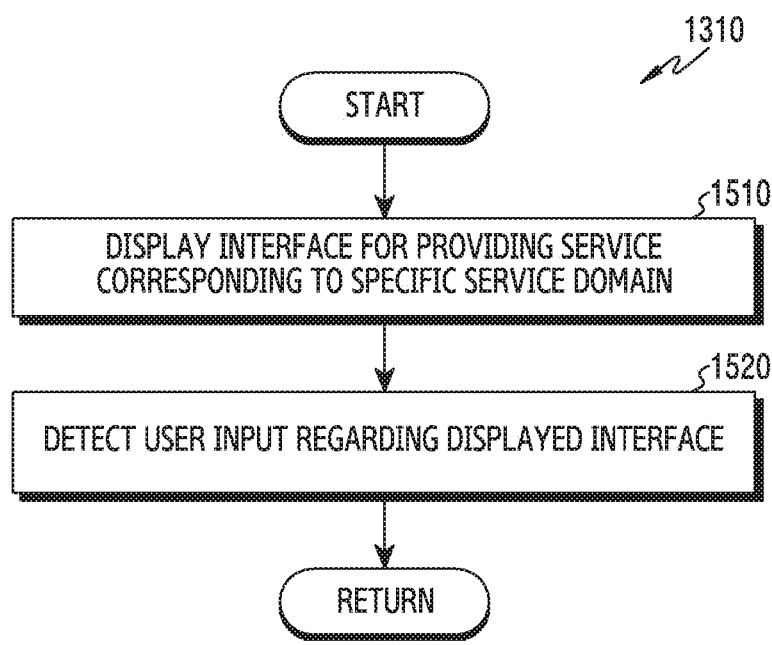
FIG. 15 illustrates a method of a voice utterance processing system for detecting a user input for configuring a specific service domain as a selected service domain according to an embodiment of the disclosure.

FIG. 15 illustrates a method of a voice utterance processing system for detecting a user input for configuring a specific service domain as a selected service domain according to an embodiment of the disclosure.

The operations illustrated in FIG. 15 may correspond to a detailed flow chart of operation 1310 illustrated in FIG. 13.

Referring to FIG. 15, in operation 1510, the processor 710 may display a user interface related to a specific service domain. The processor 710 may display a user interface for providing a service corresponding to (or related to) a specific service domain. The processor 710 may display a user interface for providing explanation on a specific service domain. For example, the processor 710 may execute an application administered by coffee chain company A in response to a user input, thereby displaying an interface for providing a service corresponding to a specific service domain. As another example, the processor 710 may receive data regarding a user interface provided by coffee chain company A in connection with coffee ordering from the outside (for example, server 530), and may display a user interface related to the received data.

In an embodiment, the user interface related to a specific service domain may include an object for configuring the specific service domain as a selected service domain.

In operation 1520, the processor 710 may detect a user input regarding the displayed interface. For example, when the displayed interface includes an object for configuring the specific service domain as a selected service domain, the processor 710 may detect a user input regarding the object.

In an embodiment, when the specific service domain has already been configured as a selected service domain, the object may configure the specific service domain as a non-selected service domain. Alternatively, the interface may include another object for configuring the specific service domain as a non-selected service domain.

FIGS. 16A, 16B, 16C and 16D illustrate a user interface for processing a user voice utterance according to various embodiments of the disclosure.

Figure 16A:
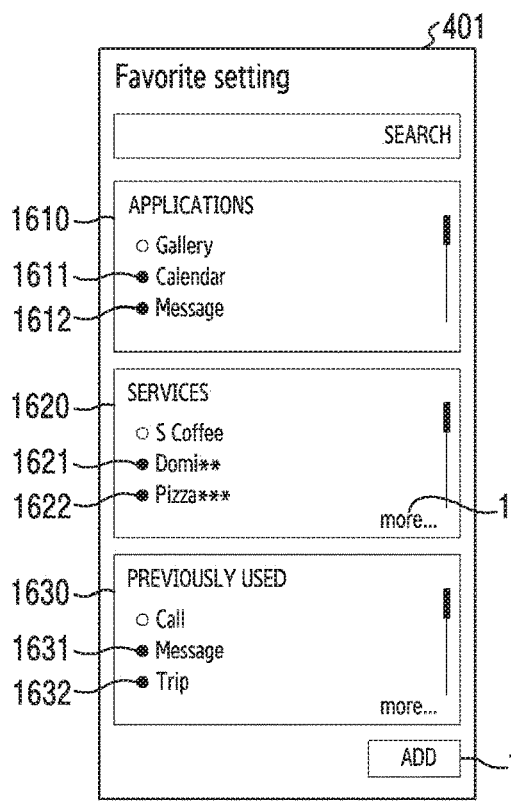
FIGS. 16A, 16B, 16C and 16D illustrate a user interface for processing a user voice utterance according to various embodiments of the disclosure.

Referring to FIG. 16A, the processor (for example, the processor 710 of FIG. 7) may display a service domain list including multiple service domains on the display (for example, the display 140 of FIG. 1). In an embodiment, the processor 710 may classify the multiple service domains according to a predetermined standard, and may display the classified service domains. For example, the processor 710 may classify the multiple service domains according to whether or not the same are installed in the electronic device 401 in an application type 1610, or according to the attribute or content of the provided service 1620. The processor 710 may sort the multiple service domains according to whether or not a corresponding offline store is close to the current user location. The processor 710 may sort the multiple service domains according to the result of analyzing the user's voice command statistics. For example, the processor 710 may sort the multiple service domains according to the number of times the same are used by the user for a designated time interval 1630.

In an embodiment, the processor 710 may detect a user input for choosing at least one service domain from the displayed list and configuring the chosen service domain as a selected service domain (for example, a user input regarding the object "add" 1670).

In an embodiment, when the multiple service domains are classified according to whether or not the same are installed in the electronic device 401 in an application type 1610, the processor 710 may receive a user input of choosing two or more service domains 1611 and 1612 from one or more service domains belonging to the same category (for example, service domains installed in the electronic device 401 in an application type).

In an embodiment, when the multiple service domains are classified according to the attribute of the provided service 1620, the processor 710 may receive a user input of choosing two or more service domains 1621 and 1622 from one or more service domains belonging to the same category (for example, ordering or delivery service).

In an embodiment, when the multiple service domains are classified according to the number of times the same are used for a designated time interval, the processor 710 may receive a user input of choosing two or more service domains 1631 and 1632 from the aligned service domains.

Figure 16B:
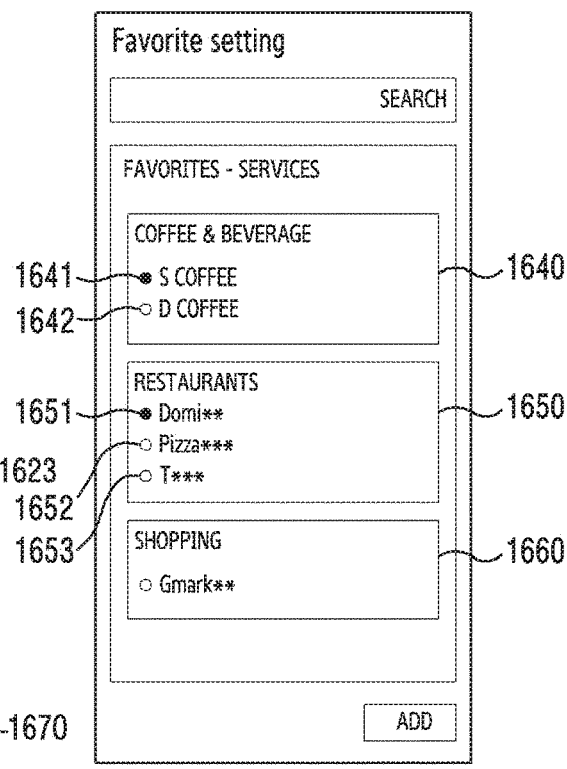

Referring to FIG. 16B, the processor 710 may display a service domain list including multiple service domains classified according to the detailed content of the provided service. For example, the processor 710 may display a list of service domains classified according to the detailed content of the provided service, in response to a user input regrading object "more" 1623 in FIG. 16A.

In an embodiment, the processor 710 may classify the multiple service domains, according to the detailed content of the provided service, into a first category 1640 corresponding to coffee and beverage, a second category 1650 corresponding to restaurants, and a third category 1660 corresponding to shopping.

In an embodiment, the processor 710 may receive the user's input of choosing only one service domain 1641 from one or more service domains belong to the first category 1640. When a user input of choosing one service domain 1641 is received, the processor 710 may deactivate the object 1642 for choosing the remaining service domains such that the remaining service domains cannot be chosen. Similarly, when the processor 710 receives a user input of choosing only one service domain 1651 from one or more service domains belonging to the second category 1650, the processor 710 may deactivate the objects 1652 and 1653 for choosing the remaining service domains.

Figure 16C:
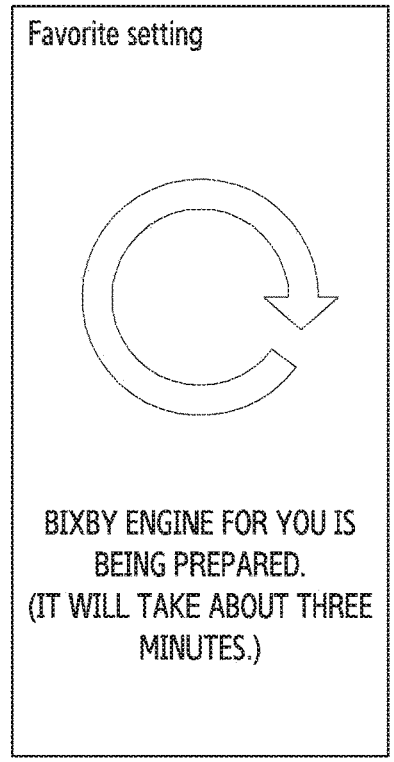

Referring to FIG. 16C, the processor (for example, the processor 810) may train a selected service domain NLU model 836 in response to a user input. In response to a user input for adding a chosen service domain as a selected service domain while the processor 810 trains the selected service domain NLU model 836, the processor 710 may display a guide message on the display (for example, the display 140) so as to indicate that the selected service domain NLU model 836 is currently trained.

Figure 16D:
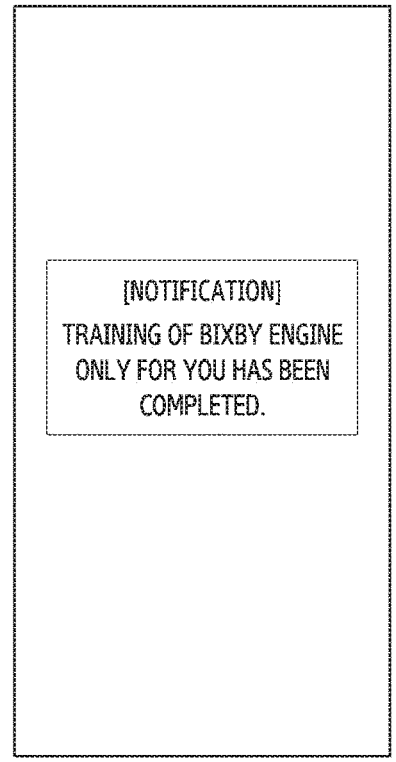

Referring to FIG. 16D, the processor 710 may display a training completion message on the display 140. For example, the processor 710 may display a training completion message indicating that a specific service domain based on the user's input has been configured as a selected service domain. In an embodiment, the processor 710 may display an additional guide message indicating that, even though the specific service domain is not explicitly included in the user utterance, the service (or function) related to the specific service domain may be provided.

Figure 17A:
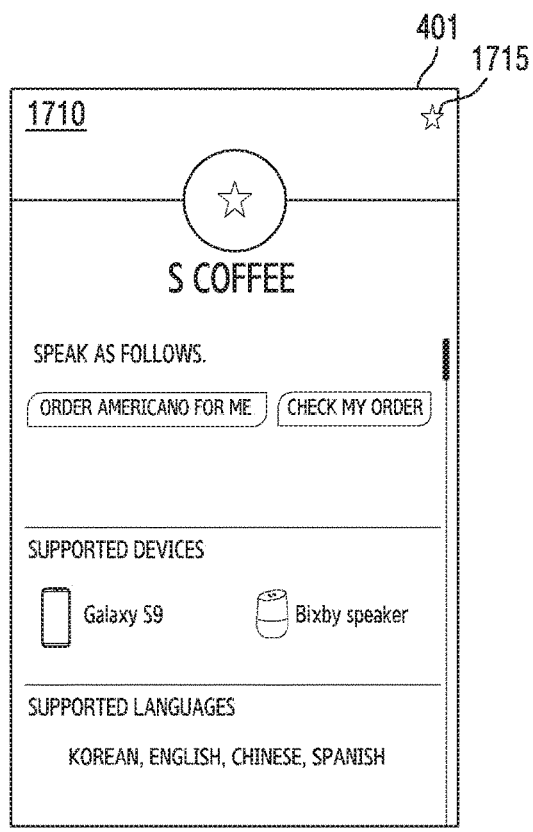
FIGS. 17A, 17B and 17C illustrate a user interface for processing a user voice utterance according to various embodiments of the disclosure.
Figure 17B:
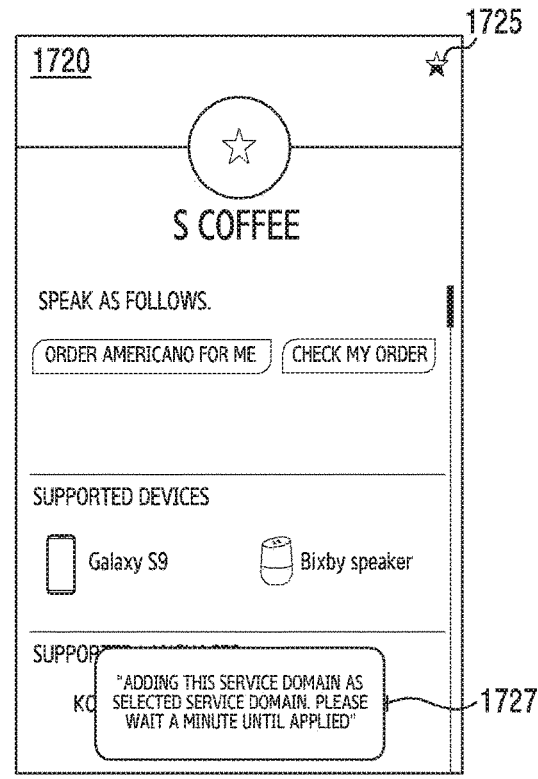
Figure 17C:
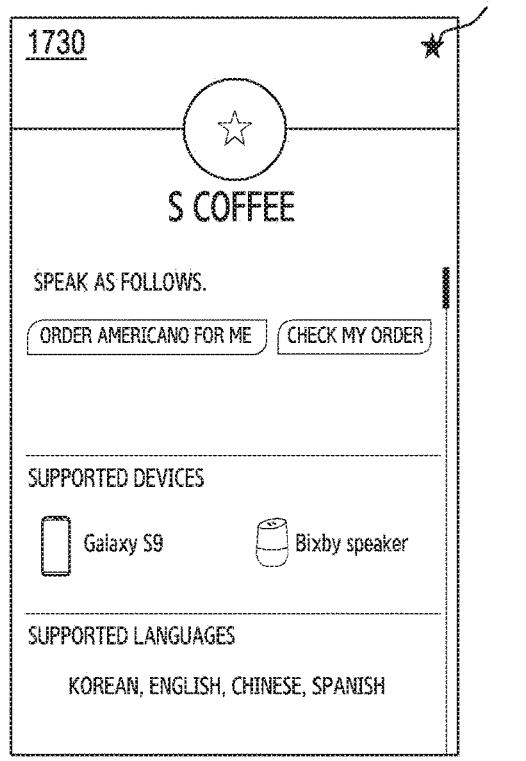

FIGS. 17A, 17B and 17C illustrate a user interface for processing a user voice utterance according to various embodiments of the disclosure.

Referring to FIG. 17A, the processor (for example, the processor 710 of FIG. 7) may display a user interface 1710 related to a specific service domain. For example, the processor may display a user interface for providing (or explaining) a service related to coffee chain company A.

In an embodiment, the user interface 1710 may display information regarding services that can be provided and information regarding supported devices and supported languages. For example, the user interface may display a list of services that can be provided. As another example, the user interface may display user utterances for calling services that can be provided.

In an embodiment, the user interface 1710 may include an object 1715 for configuring a corresponding service domain as a selected service domain. For example, in response to detection of a user input regarding the object 1715, the processor (for example, the processor 810 of FIG. 8) may add a service domain corresponding to coffee chain company A as a selected service domain, and may train a selected service domain NLU model 836.

Although not illustrated, in an embodiment, the processor 710 may display an error message. Unlike FIG. 16, the user cannot check information regarding another service domain in the same category in FIG. 17. Assuming that another service domain in the same category has been configured as a selected service domain, and only one service domain can be configured as a selected service domain in the corresponding category, the processor 710 may display, if a user input regarding the object 1715 is detected, an error message so as to indicate that the service domain related to the currently provided service cannot be configured as a selected service domain. The processor 710 may display information regarding another service domain in the corresponding category, which has been configured as a selected service domain, or may remove the other service domain from the selected service domain and may inquire the user whether or not to add the service domain related to the currently provided service as a selected service domain.

Referring to FIG. 17B, in an embodiment, the user interface 1720 may provide a guide message 1727 to the user, in connection with training a selected service domain NLU model 836, in response to a user input regarding the object 1725. For example, the user interface 1720 may provide a guide message indicating that there is an ongoing operation necessary to add the service domain corresponding to coffee chain company A as a selected service domain, and the guide message may include information regarding the remaining time necessary until completion.

In an embodiment, the user interface 1720 may include an object 1725. In order to inform that there is an ongoing operation necessary to add the corresponding service domain as a selected service domain, the object 1725 may be endowed with a highlighting effect such as changing the color over time.

Referring to FIG. 17C, in an embodiment, the processor 710 may provide an interface 1730 for providing a service related to a specific service domain. In an embodiment, the interface 1730 may be an interface displayed when the corresponding service domain has been added as a selected service domain. For example, the interface 1730 may include an object 1735 indicating that the corresponding service domain has been added as a selected service domain.

In an embodiment, the processor 710 may remove the corresponding service domain from the selected service domain in response to detection of a user input regarding the object 1735. In this case, the processor 710 may change the shape of the object 1735 to be identical to that of the object 1715 so as to inform the user that the corresponding service domain has been removed from the selected service domain.

Figure 18:
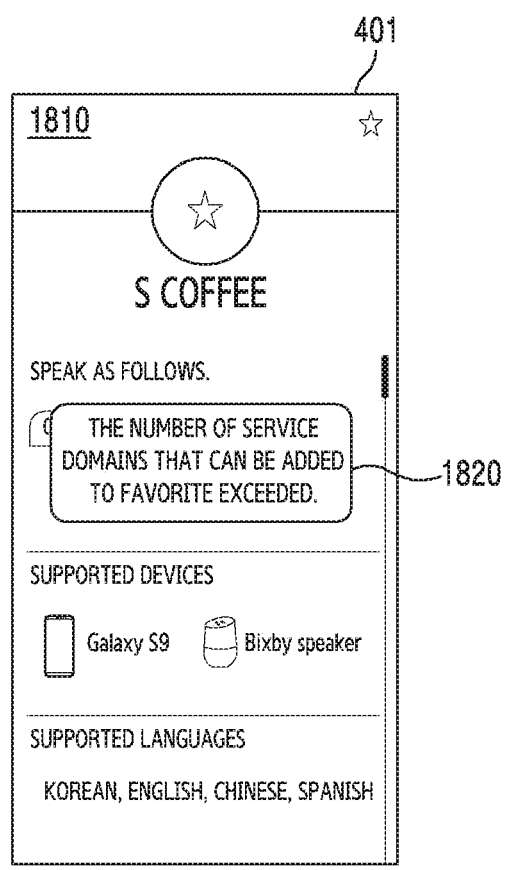
FIG. 18 illustrates a user interface for processing a user voice utterance according to an embodiment of the disclosure.

FIG. 18 illustrates a user interface for processing a user voice utterance according to an embodiment of the disclosure.

Referring to FIG. 18, a user interface 1810 illustrated in FIG. 18 may be provided to the user when a user input regarding the object 1715 of FIG. 17 is detected.

In an embodiment, the processor 710 may display an error message due to a preconfigured number limit. The number of selected service domains needs to be maintained within a preconfigured value in order to maintain the intent identification performance, as described above. When a user input regarding the object 1715 is detected, and when the number of domains configured as selected service domains has reached a predetermined value, the processor 710 may display an error message 1820 indicating that no more selected service domains can be added.

In an embodiment, the processor 710 may recommend that the least frequently used service domain be removed from the selected service domains on the basis of the user's utterance statistics information.

The computer-readable storage medium may include a hard disk, a floppy disk, a read only memory (ROM), a magnetic medium (e.g., a magnetic tape), an Optical Media (e.g., a CD-ROM, a digital versatile disc (DVD), etc.), a Magneto-Optical Media (e.g., a floptical disk), an inner memory, etc. The instruction may include a code made by a complier or a code that can be executed by an interpreter. The programming module according to the disclosure may include one or more of the aforementioned components or may further include other additional components, or some of the aforementioned components may be omitted. Operations performed by a module, a programming module, or other elements according to various embodiments may be executed sequentially, in parallel, repeatedly, or in a heuristic manner. At least some operations may be executed according to another sequence, may be omitted, or may further include other operations.

While the present has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An apparatus comprising:
   a display;
   at least one memory; and
   at least one processor operatively connected to the at least one memory,
   wherein the at least one memory stores instructions that, when executed, cause the at least one processor to:
      control the display to display a user interface to select at least one previously selected domain,
      based on the user interface, receive a user input to select the at least one previously selected domain,
      receive an input corresponding to a user utterance,
      recognize content from the user utterance,
      identify whether the content includes an explicit service domain name corresponding to at least one domain to determine an intent of the user utterance,
      based on identifying that the explicit service name is included in the content,
         perform a function corresponding to the at least one domain corresponding to the explicit service domain name, and
      based on identifying that no explicit service name is included in the content:
         identify whether the user utterance corresponds to the at least one domain previously selected by the user,
         when the user utterance corresponds to the at least one domain previously selected by the user, perform a function corresponding to the at least one domain previously selected by the user, and
         when the user utterance does not correspond to the at least one domain previously selected by the user, generate response information to provide to user based on at least one domain selected from among a plurality of normal service domains by predicting based on the user utterance,
   wherein the explicit service domain name refers to an entity providing goods and/or services to the user.

2. The apparatus of claim 1, wherein the instructions, when executed, further cause the at least one processor to determine whether the content includes the explicit service domain name by using a first natural language understanding model related to multiple domains.

3. The apparatus of claim 2, wherein the first natural language understanding model comprises at least one of a domain determination model or an intent determination model.

4. The apparatus of claim 3, wherein the instructions, when executed, further cause the at least one processor to:
   analyze the content based on the domain determination model to determine a confidence score, and
   determine whether the content includes the explicit service domain name based on the confidence score.

5. The apparatus of claim 4, wherein the instructions, when executed, further cause the at least one processor to:
   determine a second natural language understanding model corresponding to the at least one domain included in the content, and
   determine at least one of a user intent or a parameter by using the second natural language understanding model.

6. The apparatus of claim 5, wherein the instructions, when executed, further cause the at least one processor to:
   based on the user input, train the first natural language understanding model.

7. The apparatus of claim 6, wherein the instructions, when executed, further cause the at least one processor to:
   acquire rule information corresponding to the at least one domain previously selected by the user, and train the second natural language understanding model by using the rule information.

8. The apparatus of claim 1, wherein the at least one domain previously selected by the user is selected from a list of multiple domains classified according to a selected standard.

9. The apparatus of claim 1, further comprising a user interface comprising:
a guide to select the at least one domain previously selected by the user, and
a service that can be provided to the user by using the at least one domain previously selected by the user.

10. The apparatus of claim 1, wherein the apparatus comprises a mobile terminal, a stationary terminal, or a server.

11. The apparatus of claim 10, wherein the instructions further cause the at least one processor to:
in the case that the content includes a business entity, determine whether a first confidence score is greater than a first threshold associated with a first domain of the at least one domain included in the content and determine whether a second confidence score is greater than a second threshold associated with a second domain, and
in the case that the first confidence score is greater than the first threshold and the second confidence score is not greater than the second threshold, process the content using the first domain.

12. The apparatus of claim 1, wherein the at least one domain is related to a type of a service provided to the user to perform a user intent included in the user utterance or a subject that provides the service.

13. The apparatus of claim 1, wherein the at least one domain corresponds to a service provider or a service capsule corresponding to a service.

14. A method for operating an apparatus, the method comprising:
controlling a display to display a user interface to select at least one previously selected domain;
based on the user interface, receiving a user input to select the at least one previously selected domain;
receiving an input corresponding to a user utterance;
recognizing content from the user utterance;
identifying whether the content includes an explicit service domain name corresponding to at least one domain to determine an intent of the user utterance;
based on identifying that the explicit service domain name is included in the content, performing
a function corresponding to the at least one domain corresponding to the explicit service domain name; and
based on identifying that no explicit service name is included in the content:
identifying whether the user utterance corresponds to the at least one domain previously selected by the user,
when the user utterance corresponds to the at least one domain previously selected by the user, performing a function corresponding to at least one domain previously selected by the user, and
when the user utterance does not correspond to the at least one domain previously selected by the user, generating response information to provide to user based on at least one domain selected from among a plurality of normal service domains by predicting based on the user utterance,
wherein the explicit service domain name refers to an entity providing goods and/or services to the user.

15. The method of claim 14, wherein the identifying of whether the content includes the explicit service domain name comprises determining whether the content includes the explicit service domain name corresponding to the at least one domain or a service capsule corresponding to the service by using a first natural language understanding model related to multiple domains.

16. The method of claim 15, wherein the first natural language understanding model comprises at least one of a domain determination model or an intent determination model.

17. The method of claim 16, wherein the determining of whether the content corresponds to the at least one domain comprises:
analyzing the content based on the domain determination model to determine a confidence score; and
identifying whether the content includes the at least one domain based on the confidence score.

18. The method of claim 17, wherein the performing of the function corresponding to the at least one domain previously selected by the user comprises:
determining a second natural language understanding model corresponding to the at least one domain previously selected by the user; and
determining at least one of a user intent or a parameter by using the second natural language understanding model.

19. The method of claim 16, further comprising:
based on the user input, training the first natural language understanding model.

20. The method of claim 19, wherein the training of the first natural language understanding model comprises:
acquiring rule information corresponding to the at least one domain previously selected by the user; and
training the first natural language understanding model by using the rule information.

21. The method of claim 20, wherein the training of the first natural language understanding model comprises:
generating training data based on use history information; and
applying the training data to the first natural language understanding model based on the rule information.

22. The method of claim 14, wherein the at least one domain previously selected by the user from a list of multiple domains classified according to a selected standard.

23. The method of claim 14,
wherein the at least one domain previously selected by the user is related to at least one object included in a user interface, and
wherein the user interface comprises:
a guide to select the at least one domain previously selected by the user, and
a service that can be provided to the user by using the at least one domain previously selected by the user.

24. The method of claim 14, further comprising:
in the case that the content includes a business entity, determining whether a first confidence score is greater than a first threshold associated with a first domain of the at least one domain included in the content and determining whether a second confidence score is greater than a second threshold associated with a second domain; and
in the case that the first confidence score is greater than the first threshold and the second confidence score is not greater than the second threshold, processing the content using the first domain.

25. The method of claim 14, wherein the at least one domain is related to a type of a service provided to the user to perform a user intent included in the user utterance or a subject that provides the service.

26. The method of claim 14, further comprising:
   in the case that the content comprises a business entity:
      determining a user intent and a parameter associated with the user intent based on a first natural language understanding model associated with the business entity, and
      performing an action based on the user intent and the parameter.

27. The method of claim 26, further comprising receiving the first natural language understanding model from the business entity or a third party that is designated to provide the model on behalf of the business entity.

* * * * *